(12) United States Patent
Choudhuri et al.

(10) Patent No.: US 11,144,117 B1
(45) Date of Patent: Oct. 12, 2021

(54) DEEP LEARNING BASED HEAD MOTION PREDICTION FOR EXTENDED REALITY

(71) Applicant: QUALCOMM Incorporated, San Diego, CA (US)

(72) Inventors: Chiranjib Choudhuri, Bangalore (IN); Ajit Deepak Gupte, Bangalore (IN); Pushkar Gorur Sheshagiri, Bengaluru (IN); Gerhard Reitmayr, Del Mar, CA (US); Tom Edward Botterill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/876,754

(22) Filed: May 18, 2020

(51) Int. Cl.
| | |
|---|---|
| *G06F 3/01* | (2006.01) |
| *G06N 20/00* | (2019.01) |
| *G06N 3/04* | (2006.01) |
| *G06N 3/08* | (2006.01) |
| *G06F 3/0346* | (2013.01) |

(52) U.S. Cl.
CPC .............. *G06F 3/012* (2013.01); *G06F 3/013* (2013.01); *G06F 3/0346* (2013.01); *G06N 3/0454* (2013.01); *G06N 3/08* (2013.01); *G06N 20/00* (2019.01)

(58) Field of Classification Search
CPC ........ G06F 3/012; G06F 3/013; G06F 3/0346; G06N 3/08; G06N 20/00; G06N 3/0454
See application file for complete search history.

(56) References Cited

U.S. PATENT DOCUMENTS

| | | | |
|---|---|---|---|
| 2015/0235453 A1* | 8/2015 | Schowengerdt | G02B 27/01 345/633 |
| 2018/0373318 A1* | 12/2018 | Yang | G06F 3/012 |

FOREIGN PATENT DOCUMENTS

| | | | | |
|---|---|---|---|---|
| CN | 108874147 B | * | 1/2020 | |
| WO | WO-2020023399 A1 | * | 1/2020 | G06T 19/00 |

* cited by examiner

*Primary Examiner* — Maurice L. McDowell, Jr.
(74) *Attorney, Agent, or Firm* — Holland & Hart LLP

(57) ABSTRACT

Methods, systems, and devices for deep learning based head motion prediction for extended reality are described. The head pose prediction may involve training one or more layers of a machine learning network based on application data and an estimated head motion range associated with the extended reality system. The network may receive one or more bias corrected inertial measurement unit (IMU) measurements based on a sensor. The network may model a relative head pose of the user as a polynomial of time over a prediction interval based on the bias corrected IMU measurements and the trained one or more layers of the machine learning network. The network may determine a future relative head pose of the user based on the polynomial (e.g., which may be used for virtual object generation, display, etc. within an extended reality system).

20 Claims, 11 Drawing Sheets

DEEP LEARNING BASED HEAD MOTION PREDICTION FOR EXTENDED REALITY

BACKGROUND

The following relates generally to predicting head pose of a user in an extended reality system, and more specifically to deep learning based head motion prediction for extended reality.

Multimedia systems are widely deployed to provide various types of multimedia communication content such as voice, video, packet data, messaging, broadcast, and so on. These multimedia systems may be capable of processing, storage, generation, manipulation and rendition of multimedia information. Examples of multimedia systems include entertainment systems, information systems, virtual reality systems, model and simulation systems, and so on. These systems may employ a combination of hardware and software technologies to support processing, storage, generation, manipulation and rendition of multimedia information, for example, such as capture devices, storage devices, communication networks, computer systems, display devices, and gaming devices. The expansive use of multimedia systems has influenced advances made to computer-related technologies, such as online gaming and extended reality systems.

In some extended reality applications (e.g., augmented reality, virtual reality, etc.), objects from the real world and corresponding objects in the virtual world may be visible to a user (e.g., virtual objects may be laid over real world objects via the extended reality system and/or device). However, in some cases, virtual objects may become misaligned, causing visual conflict.

SUMMARY

The described techniques relate to improved methods, systems, devices, and apparatuses that support deep learning based head motion prediction for extended reality. Generally, the described techniques provide for improving extended reality applications by predicting the head pose of a user (e.g., thereby reducing misaligned virtual objects and other visual conflicts via accurate user head pose prediction). In some examples, the head pose prediction may involve training one or more layers of a machine learning network based on application data and an estimated head motion range associated with the extended reality system. The network may receive one or more bias corrected inertial measurement unit (IMU) measurements (e.g., via a sensor) and the network may model a relative head pose of the user as a polynomial of time over a prediction interval based on the bias corrected IMU measurements and the trained one or more layers. The network may then determine a future relative head pose of the user based on the polynomial (e.g., which may be used for virtual object rendering over time in accordance with the modeled relative head pose as a polynomial of time).

A method of predicting head pose of a user in an extended reality system is described. The method may include training one or more layers of a machine learning network based on application data associated with the extended reality system and an estimated head motion range associated with the extended reality system, receiving one or more bias corrected inertial measurement unit measurements based on a sensor, modeling a relative head pose of the user as a polynomial of time over a prediction interval based on the one or more bias corrected inertial measurement unit measurements and the trained one or more layers, and determining a future relative head pose of the user based on the polynomial.

An apparatus for predicting head pose of a user in an extended reality system is described. The apparatus may include a processor, memory coupled with the processor, and instructions stored in the memory. The instructions may be executable by the processor to cause the apparatus to train one or more layers of a machine learning network based on application data associated with the extended reality system and an estimated head motion range associated with the extended reality system, receive one or more bias corrected inertial measurement unit measurements based on a sensor, model a relative head pose of the user as a polynomial of time over a prediction interval based on the one or more bias corrected inertial measurement unit measurements and the trained one or more layers, and determine a future relative head pose of the user based on the polynomial.

Another apparatus for predicting head pose of a user in an extended reality system is described. The apparatus may include means for training one or more layers of a machine learning network based on application data associated with the extended reality system and an estimated head motion range associated with the extended reality system, receiving one or more bias corrected inertial measurement unit measurements based on a sensor, modeling a relative head pose of the user as a polynomial of time over a prediction interval based on the one or more bias corrected inertial measurement unit measurements and the trained one or more layers, and determining a future relative head pose of the user based on the polynomial.

A non-transitory computer-readable medium storing code for predicting head pose of a user in an extended reality system is described. The code may include instructions executable by a processor to train one or more layers of a machine learning network based on application data associated with the extended reality system and an estimated head motion range associated with the extended reality system, receive one or more bias corrected inertial measurement unit measurements based on a sensor, model a relative head pose of the user as a polynomial of time over a prediction interval based on the one or more bias corrected inertial measurement unit measurements and the trained one or more layers, and determine a future relative head pose of the user based on the polynomial.

In some examples of the method, apparatuses, and non-transitory computer-readable medium described herein, training the one or more layers of the machine learning network may include operations, features, means, or instructions for training the one or more layers on-line using the application data, eye gaze tracking data, estimated body pose data, posture detection data, or some combination thereof. In some examples of the method, apparatuses, and non-transitory computer-readable medium described herein, the one or more layers may be trained on-line based on a prediction error associated with the machine learning network.

Some examples of the method, apparatuses, and non-transitory computer-readable medium described herein may further include operations, features, means, or instructions for determining side channel data based on the user, the application data, or both, where the future relative head pose may be determined based on the side channel data and the polynomial. Some examples of the method, apparatuses, and non-transitory computer-readable medium described herein may further include operations, features, means, or instructions for modeling uncertainty of the polynomial based on a prediction error associated with the machine learning network, and determining a weighted combination of the polynomial and the side channel data, where the future relative head pose may be based on the weighted combination. In some examples of the method, apparatuses, and non-transitory computer-readable medium described herein, a weighting of the side channel data in the weighted combination increases as the uncertainty of the polynomial increases. In some examples of the method, apparatuses, and non-transitory computer-readable medium described herein, the side channel data includes virtual object data, future virtual object data, sound data, future sound data, eye gaze tracking data, or some combination thereof.

In some examples of the method, apparatuses, and non-transitory computer-readable medium described herein, modeling the relative head pose of the user as the polynomial of time over the prediction interval may include operations, features, means, or instructions for determining a degree of the polynomial, one or more coefficients of the polynomial, or both, based on a length of the prediction interval. In some examples of the method, apparatuses, and non-transitory computer-readable medium described herein, the degree of the polynomial increases as the length of the prediction interval increases.

Some examples of the method, apparatuses, and non-transitory computer-readable medium described herein may further include operations, features, means, or instructions for inputting the one or more bias corrected inertial measurement unit measurements into a long short-term memory architecture of the machine learning network, where the polynomial may be modeled based on the one or more bias corrected inertial measurement unit measurements input into the long short-term memory architecture. Some examples of the method, apparatuses, and non-transitory computer-readable medium described herein may further include operations, features, means, or instructions for determining a future time for the future relative head pose determination, where the future relative head pose determination may be based on the polynomial and the determined future time. In some examples of the method, apparatuses, and non-transitory computer-readable medium described herein, the future relative head pose includes a relative head pose rotation at the future time and a relative head pose translation at the future time.

In some examples of the method, apparatuses, and non-transitory computer-readable medium described herein, the estimated head motion range may be based on estimated head pose limitations of the user, the application data, or both. Some examples of the method, apparatuses, and non-transitory computer-readable medium described herein may further include operations, features, means, or instructions for determining a relative display position for one or more virtual objects based on the future relative head pose of the user, and displaying the one or more virtual objects based on the relative display position.

DETAILED DESCRIPTION

Figure 1:
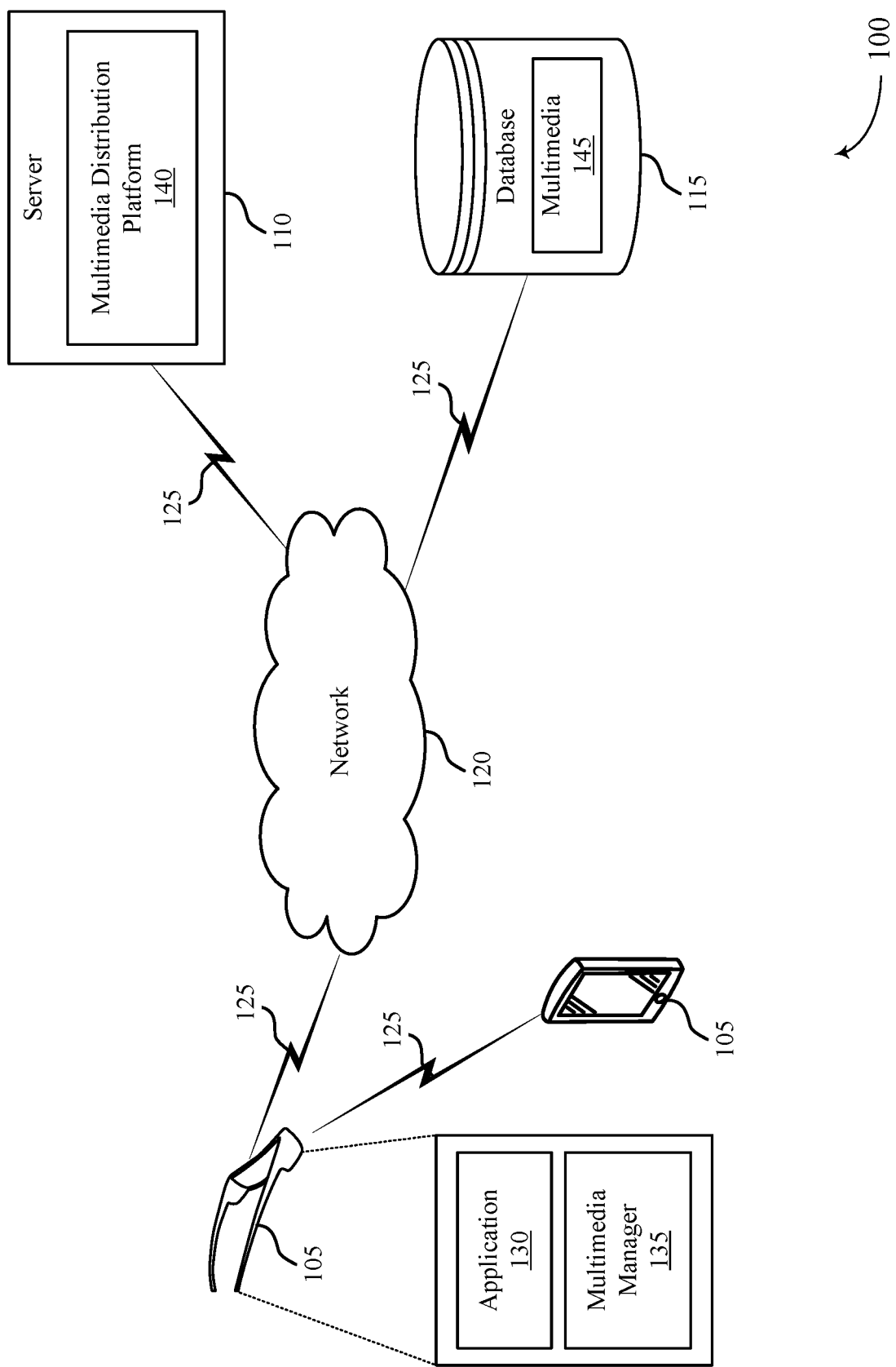
FIG. 1 illustrates an example of a system for predicting head pose of a user in an extended reality system that supports deep learning based head motion prediction for extended reality in accordance with aspects of the present disclosure.

The described techniques relate to improved methods, systems, or devices that support deep learning based head motion prediction for extended reality (e.g., where extended reality may refer to virtual reality, augmented reality, etc.). In some cases, a user may wear an extended reality device (e.g., a wearable headset), which may implement one or more aspects of a virtual reality system, an augmented reality system, etc. For example, the device may project a view for the user. The view may include elements from the real world as well as elements from the virtual world, which may be overlapping (e.g., a wearable headset may overlay virtual objects on top of real world user visibility). In some cases, virtual objects may become misaligned causing visual conflict (e.g., user head movement may result in misalignment between virtual objects and real world objects). This misalignment may cause visual conflict, which may be referred to as a dynamic registration error, resulting in degraded user experience. In some cases, the dynamic registration error may result from latency in the system (e.g., end-to-end system delay), which may be caused by rendering and time warping. Improved techniques for predictive head pose tracking (i.e., predicting user head position and head orientation at a future time) may be desired.

The techniques described herein may provide for improved predictive head pose tracking by using a deep learning model that accounts for sensor statistics, application information or data, or both. The head pose prediction may involve training one or more layers of a machine learning network based on application information or application data (e.g., related virtual object patterns, audio patterns, etc. in an application or game) and an estimated head motion range associated with the extended reality system. In some cases, the network may receive one or more sensor statistics, such as bias corrected inertial measurement unit (IMU) measurements. The network may model a relative head pose of the user as a polynomial of time over a prediction interval based on the sensor statistics. For example, the network may use a Taylor series approximation to model relative head pose as a polynomial of time. The network may determine a future relative head pose of the user based on the polynomial.

As such, according to the described techniques, user head pose (e.g., relative head pose, future rotation and translation head motion, etc.) may be predicted for extended reality applications based on deep learning, inherent patterns in head movement, bias corrected IMU measurements, and side channel information. For example, an extended reality system may predict head pose based on a machine learning model using a Taylor series approximation to model relative head pose as a polynomial of time over a prediction interval based on inherent patterns in head movement and bias corrected IMU measurements. Further, the system may utilize side channel information (e.g., on-line learning by training 1-2 fully connected layers based on application data, eye gaze tracking data, limits of human motion, posture detection, sound source, etc.) to increase accuracy in the pose prediction generated by the machine learning model. Such techniques may provide for more accurate user head pose measurement and more accurate user head pose prediction (e.g., at one or more future times). Improved accuracy in head pose measurement and prediction may generally provide for improved extended reality performance. For example, the techniques described herein may provide for more accurate positioning and timing of virtual objects (e.g., of virtual object rendering) by extended reality systems based on user head pose measurements and user head pose prediction models described herein.

Aspects of the disclosure are initially described in the context of a multimedia system. Aspects of the disclosure are further illustrated by and described with reference to a device, an extended reality diagram, a machine learning system, and a flowchart. Aspects of the disclosure are further illustrated by and described with reference to apparatus diagrams, system diagrams, and flowcharts that relate to deep learning based head motion prediction for extended reality.

FIG. 1 illustrates a multimedia system 100 for a device that supports deep learning based head motion prediction for extended reality in accordance with aspects of the present disclosure. The multimedia system 100 may include devices 105, a server 110, and a database 115. Although, the multimedia system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports deep learning based head motion prediction for extended reality, such as multimedia packets, multimedia data, or multimedia control information, via network 120 using communications links 125. In some cases, a portion or all of the techniques described herein supporting deep learning based head motion prediction for extended reality may be performed by the devices 105 or the server 110, or both.

A device 105 may be a cellular phone, a smartphone, a personal digital assistant (PDA), a wireless communication device, a handheld device, a tablet computer, a laptop computer, a cordless phone, a display device (e.g., monitors), and/or the like that supports various types of communication and functional features related to multimedia (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., multimedia-related information).

The devices 105 may include an application 130 and a multimedia manager 135. While, the multimedia system 100 illustrates the devices 105 including both the application 130 and the multimedia manager 135, the application 130 and the multimedia manager 135 may be an optional feature for the devices 105. In some cases, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125.

The multimedia manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the multimedia manager 135 may process multimedia (e.g., image data, video data, audio data) from and/or write multimedia data to a local memory of the device 105 or to the database 115.

The multimedia manager 135 may also be configured to provide multimedia enhancements, multimedia restoration, multimedia analysis, multimedia compression, multimedia streaming, and multimedia synthesis, among other functionality. For example, the multimedia manager 135 may perform white balancing, cropping, scaling (e.g., multimedia compression), adjusting a resolution, multimedia stitching, color processing, multimedia filtering, spatial multimedia filtering, artifact removal, frame rate adjustments, multimedia encoding, multimedia decoding, and multimedia filtering. By further example, the multimedia manager 135 may process multimedia data to support deep learning based head motion prediction for extended reality, according to the techniques described herein.

The server 110 may be a data server, a cloud server, a server associated with an multimedia subscription provider, proxy server, web server, application server, communications server, home server, mobile server, or any combination thereof. The server 110 may in some cases include a multimedia distribution platform 140. The multimedia distribution platform 140 may allow the devices 105 to discover, browse, share, and download multimedia via network 120 using communications links 125, and therefore provide a digital distribution of the multimedia from the multimedia distribution platform 140. As such, a digital distribution may be a form of delivering media content such as audio, video, images, without the use of physical media but over online delivery mediums, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The database 115 may store a variety of information, such as instructions or commands (e.g., multimedia-related information). For example, the database 115 may store multimedia 145. The device may support deep learning based head motion prediction for extended reality associated with the multimedia 145. The device 105 may retrieve the stored data from the database 115 via the network 120 using communication links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information). The database 115 may store a reference model (e.g., a machine learning model, a simulation model, etc.), and in some cases, the machine learning model may be updated based on user input received from a device 105.

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the multimedia system 100 may include uplink transmissions from the device 105 to the server 110 and the database 115, and/or downlink transmissions, from the server 110 and the database 115 to the device 105. The wireless links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

In some cases, a device 105 may monitor user input attributes via a sensor on the device 105. For example, the device 105 may monitor data related to user reflex time, user eye motion, user heart rate, one or more user gameplay patterns, user breathing rate, user breathing patterns, etc., or any combination thereof. Generally, the device 105 may monitor user actions, real-time application data, patterns in application data, patterns in user interactions with the application 130, etc. for virtual object generation in an extended reality system. In some examples, the device 105 may run the application 130. The device 105 may also implement one or more functions of the server 110 and/or the database 115. For example, the device 105 may utilize the server 110 to monitor the application 130 for side channel data. In some additional or alternative cases, a server 110 may monitor a multimedia manager 135 for side channel data.

In some cases, a device 105, a server 110, an application 130, etc. may determine one or more patterns for predicting or measuring user head pose. In some examples, an ideal behavior interaction with an application 130 or a device 105, or both, may be determined based on side channel data (e.g., where a virtual object is moving relative to real world objects) and/or the monitoring of the behaviors of a user interacting with applications 130 or devices 105, or both. In some cases, server 110 (e.g., via multimedia distribution platform 140) may use physics simulators to determine an ideal behavior with a user, application 130, and/or peripheral device 105. In some cases, server 110 (e.g., via multimedia distribution platform 140) may associate behaviors of users interacting with application 130 or device 105, or both, to determine a predicted (e.g., an ideal) behavior (e.g., or head pose) with application 130 or device 105, or both.

In some examples, a device 105 or a server 110 may process information (e.g., from a database 115) via machine learning techniques. For example, a server 110 may be configured to use machine learning to determine how users are controlling input devices (e.g., user head pose when wearing an input device, such as a device 105) and the server 110 may use sensor information (e.g., IMU measurements), side channel data (e.g., associated with application 130), etc. to augment the determination of current and/or future user head pose. In some cases, the server 110 may process the information from the database 115 via machine learning techniques to identify a correlation between a user head pose prediction and side channel data or one or more IMU measurements, or between a user head pose prediction and a combination of side channel data and one or more IMU measurements. In some cases, the data from the database 115 may include information from other users (e.g., head pose patterns of other users experiencing similar extended reality applications). Examples of the machine learning techniques may include linear regression, logistic regression, decision tree, support vector machine (SVM), naive Bayes, k-nearest neighbor, random forest, dimensionality reduction algorithms, gradient boosting algorithms, or any combination thereof.

The described techniques relate to improved methods, systems, or devices that support deep learning based head motion prediction for extended reality. A user may wear an extended reality device, such as a device 105 (e.g., a wearable headset), which may implement aspects of extended reality, virtual reality, augmented reality, etc. In some cases, the device 105 may project a view for the user. The view may include elements from the real world as well as elements from the virtual world, which may be overlapping. For instance, a device 105 may overlay virtual objects on top of real world objects (e.g., device 105 overlay virtual objects on transparent glass, such that the virtual objects are overlaid on top of real world objects from the perspective of a user of the device 105). In some cases, the user head movement may result in misalignment between virtual objects and real world objects. This misalignment may cause visual conflict, which may be referred to as a dynamic registration error. In some cases, the dynamic registration error may result from inaccurate head pose prediction and/or latency in the multimedia system 100 (e.g., end-to-end system delay), which may be caused by rendering and time warping. Improved techniques for predictive head pose tracking (i.e., predicting a head pose in the future) may be desired.

The techniques described herein may provide for improved predictive head pose tracking by using a deep learning model that accounts for sensor statistics, application information or data, or both. In some cases, the head pose prediction may involve training one or more layers of a machine learning network based on application information or data (e.g., related to one or more patterns in an application or game) and an estimated head motion range associated with the extended reality system (e.g., which may be further based on application or side channel data). In some cases, the machine learning network may receive one or more sensor statistics, such as bias corrected IMU measurements. The machine learning network may model a relative head pose of the user as a polynomial of time over a prediction interval based on the sensor statistics. For example, the machine learning network may use a Taylor series approximation to model relative head pose as a polynomial of time. The machine learning network may determine a future relative head pose of the user based on the polynomial.

The techniques described herein may provide improvements in head pose prediction for extended reality. Furthermore, the techniques described herein may provide benefits and enhancements to the operation of the devices 105. For example, by using a deep learning model and application information or data to predict a head pose of a user, the operational characteristics, such as power consumption, processor utilization (e.g., DSP, CPU, GPU, ISP processing utilization), and memory usage of the devices 105 may be reduced. The techniques described herein may also reduce dynamic registration error (e.g., from misalignment of virtual objects and real world objects) by reducing rendering time, which may reduce latency at the devices 105 associated with processes related to head pose measurement and virtual object display for extended reality applications. Generally, such may improve extended reality system performance and overall user experience.

Figure 2:
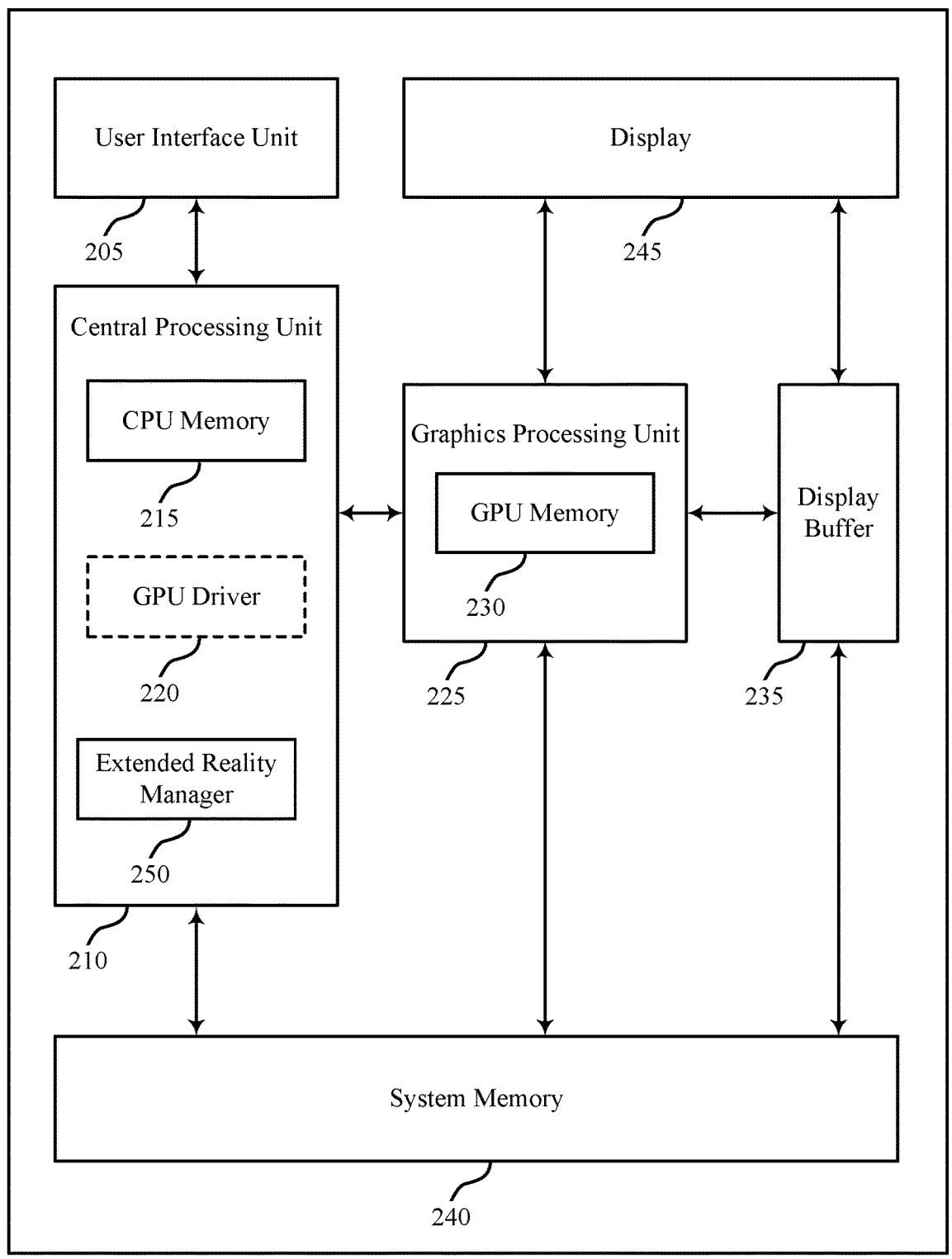
FIG. 2 illustrates a device that supports deep learning based head motion prediction for extended reality in accordance with aspects of the present disclosure.

In the example of FIG. 2, device 200 includes a central processing unit (CPU) 210 having CPU memory 215, a GPU 225 having GPU memory 230, a display 245, a display buffer 235 storing data associated with rendering, a user interface unit 205, and a system memory 240. For example, system memory 240 may store a GPU driver 220 (illustrated as being contained within CPU 210 as described below) having a compiler, a GPU program, a locally-compiled GPU program, and the like. User interface unit 205, CPU 210, GPU 225, system memory 240, display 245, and extended reality manager 250 may communicate with each other (e.g., using a system bus).

Examples of CPU 210 include, but are not limited to, a digital signal processor (DSP), general purpose microprocessor, application specific integrated circuit (ASIC), field programmable logic array (FPGA), or other equivalent integrated or discrete logic circuitry. Although CPU 210 and GPU 225 are illustrated as separate units in the example of FIG. 2, in some examples, CPU 210 and GPU 225 may be integrated into a single unit. CPU 210 may execute one or more software applications. Examples of the applications may include operating systems, word processors, web browsers, e-mail applications, spreadsheets, video games, audio and/or video capture, playback or editing applications, or other such applications that initiate the generation of image data to be presented via display 245. As illustrated, CPU 210 may include CPU memory 215. For example, CPU memory 215 may represent on-chip storage or memory used in executing machine or object code. CPU memory 215 may include one or more volatile or non-volatile memories or storage devices, such as flash memory, a magnetic data media, an optical storage media, etc. CPU 210 may be able to read values from or write values to CPU memory 215 more quickly than reading values from or writing values to system memory 240, which may be accessed, e.g., over a system bus.

GPU 225 may represent one or more dedicated processors for performing graphical operations. That is, for example, GPU 225 may be a dedicated hardware unit having fixed function and programmable components for rendering graphics and executing GPU applications. GPU 225 may also include a DSP, a general purpose microprocessor, an ASIC, an FPGA, or other equivalent integrated or discrete logic circuitry. GPU 225 may be built with a highly-parallel structure that provides more efficient processing of complex graphic-related operations than CPU 210. For example, GPU 225 may include a plurality of processing elements that are configured to operate on multiple vertices or pixels in a parallel manner. The highly parallel nature of GPU 225 may allow GPU 225 to generate graphic images (e.g., graphical user interfaces and two-dimensional or three-dimensional graphics scenes) for display 245 more quickly than CPU 210.

GPU 225 may, in some instances, be integrated into a motherboard of device 200. In other instances, GPU 225 may be present on a graphics card that is installed in a port in the motherboard of device 200 or may be otherwise incorporated within a peripheral device configured to interoperate with device 200. As illustrated, GPU 225 may include GPU memory 230. For example, GPU memory 230 may represent on-chip storage or memory used in executing machine or object code. GPU memory 230 may include one or more volatile or non-volatile memories or storage devices, such as flash memory, a magnetic data media, an optical storage media, etc. GPU 225 may be able to read values from or write values to GPU memory 230 more quickly than reading values from or writing values to system memory 240, which may be accessed, e.g., over a system bus. That is, GPU 225 may read data from and write data to GPU memory 230 without using the system bus to access off-chip memory. This operation may allow GPU 225 to operate in a more efficient manner by reducing the need for GPU 225 to read and write data via the system bus, which may experience heavy bus traffic.

Display 245 represents a unit capable of displaying video, images, text or any other type of data for consumption by a viewer. Display 245 may include a liquid-crystal display (LCD), a light emitting diode (LED) display, an organic LED (OLED), an active-matrix OLED (AMOLED), or the like. Display buffer 235 represents a memory or storage device dedicated to storing data for presentation of imagery, such as computer-generated graphics, still images, video frames, or the like for display 245. Display buffer 235 may represent a two-dimensional buffer that includes a plurality of storage locations. The number of storage locations within display buffer 235 may, in some cases, generally correspond to the number of pixels to be displayed on display 245. For example, if display 245 is configured to include 640×480 pixels, display buffer 235 may include 640×480 storage locations storing pixel color and intensity information, such as red, green, and blue pixel values, or other color values. Display buffer 235 may store the final pixel values for each of the pixels processed by GPU 225. Display 245 may retrieve the final pixel values from display buffer 235 and display the final image based on the pixel values stored in display buffer 235.

User interface unit 205 represents a unit with which a user may interact with or otherwise interface to communicate with other units of device 200, such as CPU 210. Examples of user interface unit 205 include, but are not limited to, a trackball, a mouse, a keyboard, and other types of input devices. User interface unit 205 may also be, or include, a touch screen and the touch screen may be incorporated as part of display 245.

System memory 240 may comprise one or more computer-readable storage media. Examples of system memory 240 include, but are not limited to, a random access memory (RAM), static RAM (SRAM), dynamic RAM (DRAM), a read-only memory (ROM), an electrically erasable programmable read-only memory (EEPROM), a compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor. System memory 240 may store program modules and/or instructions that are accessible for execution by CPU 210. Additionally, system memory 240 may store user applications and application surface data associated with the applications. System memory 240 may in some cases store information for use by and/or information generated by other components of device 200. For example, system memory 240 may act as a device memory for GPU 225 and may store data to be operated on by GPU 225 as well as data resulting from operations performed by GPU 225

In some examples, system memory 240 may include instructions that cause CPU 210 or GPU 225 to perform the functions ascribed to CPU 210 or GPU 225 in aspects of the present disclosure. System memory 240 may, in some examples, be considered as a non-transitory storage medium. The term "non-transitory" should not be interpreted to mean that system memory 240 is non-movable. As one example, system memory 240 may be removed from device 200 and moved to another device. As another example, a system memory substantially similar to system memory 240 may be inserted into device 200. In certain examples, a non-transitory storage medium may store data that can, over time, change (e.g., in RAM).

System memory 240 may store a GPU driver 220 and compiler, a GPU program, and a locally-compiled GPU program. The GPU driver 220 may represent a computer program or executable code that provides an interface to access GPU 225. CPU 210 may execute the GPU driver 220 or portions thereof to interface with GPU 225 and, for this reason, GPU driver 220 is shown in the example of FIG. 2 within CPU 210. GPU driver 220 may be accessible to programs or other executables executed by CPU 210, including the GPU program stored in system memory 240. Thus, when one of the software applications executing on CPU 210 requires graphics processing, CPU 210 may provide graphics commands and graphics data to GPU 225 for rendering to display 245 (e.g., via GPU driver 220).

In some cases, the GPU program may include code written in a high level (HL) programming language, e.g., using an application programming interface (API). Examples of APIs include Open Graphics Library ("OpenGL"), DirectX, Render-Man, WebGL, or any other public or proprietary standard graphics API. The instructions may also conform to so-called heterogeneous computing libraries, such as Open-Computing Language ("OpenCL"), DirectCompute, etc. In general, an API includes a predetermined, standardized set of commands that are executed by associated hardware. API commands allow a user to instruct hardware components of a GPU 225 to execute commands without user knowledge as to the specifics of the hardware components. In order to process the graphics rendering instructions, CPU 210 may issue one or more rendering commands to GPU 225 (e.g., through GPU driver 220) to cause GPU 225 to perform some or all of the rendering of the graphics data. In some examples, the graphics data to be rendered may include a list of graphics primitives (e.g., points, lines, triangles, quadrilaterals, etc.).

The GPU program stored in system memory 240 may invoke or otherwise include one or more functions provided by GPU driver 220. CPU 210 generally executes the program in which the GPU program is embedded and, upon encountering the GPU program, passes the GPU program to GPU driver 220. CPU 210 executes GPU driver 220 in this context to process the GPU program. That is, for example, GPU driver 220 may process the GPU program by compiling the GPU program into object or machine code executable by GPU 225. This object code may be referred to as a locally-compiled GPU program. In some examples, a compiler associated with GPU driver 220 may operate in real-time or near-real-time to compile the GPU program during the execution of the program in which the GPU program is embedded. For example, the compiler generally represents a unit that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, but not limited to, CPU 210 and GPU 225).

In the example of FIG. 2, the compiler may receive the GPU program from CPU 210 when executing HL code that includes the GPU program. That is, a software application being executed by CPU 210 may invoke GPU driver 220 (e.g., via a graphics API) to issue one or more commands to GPU 225 for rendering one or more graphics primitives into displayable graphics images. The compiler may compile the GPU program to generate the locally-compiled GPU program that conforms to a LL programming language. The compiler may then output the locally-compiled GPU program that includes the LL instructions. In some examples, the LL instructions may be provided to GPU 225 in the form a list of drawing primitives (e.g., triangles, rectangles, etc.).

The LL instructions (e.g., which may alternatively be referred to as primitive definitions) may include vertex specifications that specify one or more vertices associated with the primitives to be rendered. The vertex specifications may include positional coordinates for each vertex and, in some instances, other attributes associated with the vertex, such as color coordinates, normal vectors, and texture coordinates. The primitive definitions may include primitive type information, scaling information, rotation information, and the like. Based on the instructions issued by the software application (e.g., the program in which the GPU program is embedded), GPU driver 220 may formulate one or more commands that specify one or more operations for GPU 225 to perform in order to render the primitive. When GPU 225 receives a command from CPU 210, it may decode the command and configure one or more processing elements to perform the specified operation and may output the rendered data to display buffer 235.

GPU 225 generally receives the locally-compiled GPU program, and then, in some instances, GPU 225 renders one or more images and outputs the rendered images to display buffer 235. For example, GPU 225 may generate a number of primitives to be displayed at display 245. Primitives may include one or more of a line (including curves, splines, etc.), a point, a circle, an ellipse, a polygon (e.g., a triangle), or any other two-dimensional primitive. The term "primitive" may also refer to three-dimensional primitives, such as cubes, cylinders, sphere, cone, pyramid, torus, or the like. Generally, the term "primitive" refers to any basic geometric shape or element capable of being rendered by GPU 225 for display as an image (or frame in the context of video data) via display 245. GPU 225 may transform primitives and other attributes (e.g., that define a color, texture, lighting, camera configuration, or other aspect) of the primitives into a so-called "world space" by applying one or more model transforms (which may also be specified in the state data). Once transformed, GPU 225 may apply a view transform for the active camera (which again may also be specified in the state data defining the camera) to transform the coordinates of the primitives and lights into the camera or eye space. GPU 225 may also perform vertex shading to render the appearance of the primitives in view of any active lights. GPU 225 may perform vertex shading in one or more of the above model, world, or view space.

Once the primitives are shaded, GPU 225 may perform projections to project the image into a canonical view volume. After transforming the model from the eye space to the canonical view volume, GPU 225 may perform clipping to remove any primitives that do not at least partially reside within the canonical view volume. That is, GPU 225 may remove any primitives that are not within the frame of the camera. GPU 225 may then map the coordinates of the primitives from the view volume to the screen space, effectively reducing the three-dimensional coordinates of the primitives to the two-dimensional coordinates of the screen. Given the transformed and projected vertices defining the primitives with their associated shading data, GPU 225 may then rasterize the primitives. Generally, rasterization may refer to the task of taking an image described in a vector graphics format and converting it to a raster image (e.g., a pixelated image) for output on a video display or for storage in a bitmap file format.

A GPU 225 may include a dedicated fast bin buffer (e.g., a fast memory buffer, such as GMEM, which may be referred to by GPU memory 230). As discussed herein, a rendering surface may be divided into bins. In some cases, the bin size is determined by format (e.g., pixel color and depth information) and render target resolution divided by the total amount of GMEM. The number of bins may vary based on device 200 hardware, target resolution size, and target display format. A rendering pass may draw (e.g., render, write, etc.) pixels into GMEM (e.g., with a high bandwidth that matches the capabilities of the GPU). The GPU 225 may then resolve the GMEM (e.g., burst write blended pixel values from the GMEM, as a single layer, to a display buffer 235 or a frame buffer in system memory 240). Such may be referred to as bin-based or tile-based rendering. When all bins are complete, the driver may swap buffers and start the binning process again for a next frame.

For example, GPU 225 may implement a tile-based architecture that renders an image or rendering target by breaking the image into multiple portions, referred to as tiles or bins. The bins may be sized based on the size of GPU memory 230 (e.g., which may alternatively be referred to herein as GMEM or a cache), the resolution of display 245, the color or Z precision of the render target, etc. When implementing tile-based rendering, GPU 225 may perform a binning pass and one or more rendering passes. For example, with respect to the binning pass, GPU 225 may process an entire image and sort rasterized primitives into bins.

In some cases, device 200 may include an extended reality manager 250. The extended reality manager may implement deep learning based head motion prediction for a user. In some cases, the extended reality manager 250 may implement aspects of extended reality, augmented reality, virtual reality, etc. For instance, the extended reality manager 250 may identify and generate virtual objects based on predicted user head pose modeled as a function of tie (e.g., in accordance with the techniques described herein). The device 200 may use sensor statistics from monitored sensors. Some examples of the monitored sensors may include IMUs, eye trackers, tremor sensors, heart rate sensors, etc. In some cases, an IMU may be included in a device 200 (e.g., a game controller, virtual reality headset, etc.), and may measure and report a body's specific force, angular rate, and sometimes the orientation of the body, using some combination of accelerometers, gyroscopes, or magnetometers. Additionally or alternatively, the device 200 and/or extended reality manager 250 may use application data associated with the extended reality system (e.g., side channel information). For example, the device 200 may determine whether to use sensor statistics, data associated with the extended reality system, or both to predict a head pose for a user (e.g., where the predicted user head poser may be used by extended reality manager 250 for virtual object generation in addition to other extended reality operations).

Figure 3:
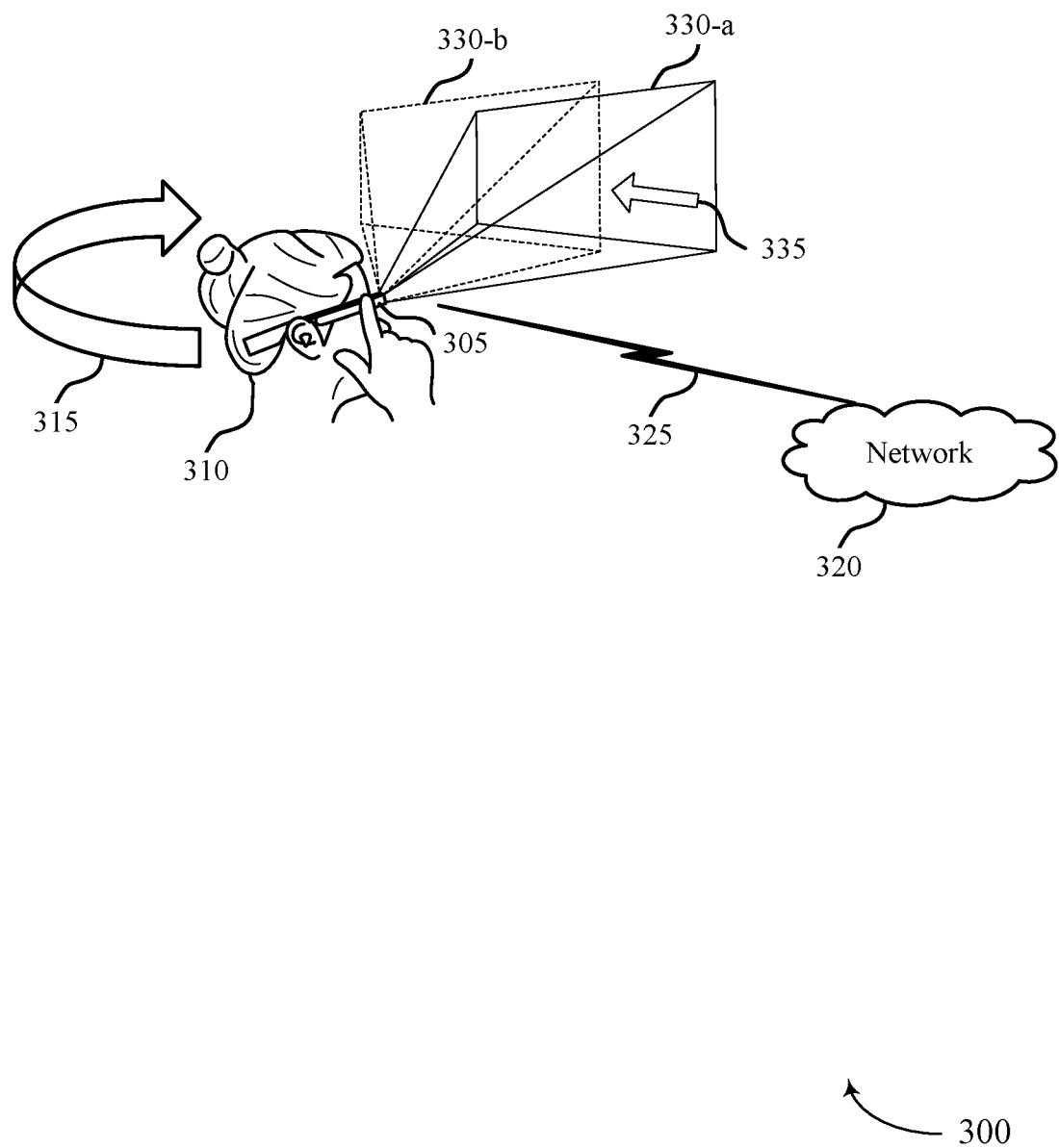
FIG. 3 illustrates an example of an extended reality diagram that supports deep learning based head motion prediction for extended reality in accordance with aspects of the present disclosure.

FIG. 3 illustrates an example of an extended reality diagram 300 that supports deep learning based head motion prediction for extended reality in accordance with aspects of the present disclosure. In some examples, extended reality diagram 300 may implement aspects of multimedia system 100 and device 200. In some cases, extended reality diagram 300 may include a device 305, a network 320, and a communication link 325, which may be examples of a device 105, a communication link 125, and a network 120 as described with reference to FIG. 1. As described herein, the device 305 (e.g., worn by a user 310) may account for a head motion 315 based on a deep learning model. In some cases, the device 305 may be an extended reality device, which may generally implement aspects of extended reality, virtual reality, augmented reality, etc. Systems including a device 305, a network 320, or other elements in extended reality diagram 300 may be referred to as extended reality systems.

The device 305 may overlay virtual objects with real world objects in a view 330. For example, the view 330 may generally refer to visual input to a user 310 via the device 305, a display generated by the device 305, a configuration of virtual objects generated by the device 305, etc. That is, view 330-*a* may refer to visible real world objects and visible virtual objects, overlaid on or coexisting with the real world objects, at some initial time. View 330-*b* may refer to visible real world objects and visible virtual objects, overlaid on or coexisting with the real world objects, at some later time. As discussed herein, positional differences in real world objects (e.g., and thus overlaid virtual objects) may arise from view 330-*a* shifting to view 330-*b* at 335 due to head motion 315.

Generally, device 305 may generate, display, project, etc. virtual objects to be viewed by a user 310 (e.g., where virtual objects may be displayed based on user 310 head pose prediction in accordance with the techniques described herein). In some examples, the device 305 may include a transparent surface (e.g., optical glass) such that virtual objects may be displayed on the transparent surface to overlay virtual objects on real word objects viewed through the transparent surface. Additionally or alternatively, the device 305 may project virtual objects onto the real world environment. In some cases, the device 305 may include a camera and may display both real world objects (e.g., as captured by the camera) and virtual objects overlaid on displayed real world objects. In various examples, device 305 may include aspects of a virtual reality headset, smart glass, a live feed video camera, a GPU, one or more sensors (e.g., such as one or more IMUS, image sensors, microphones, etc.), one or more output devices (e.g., such as speakers, display, smart glass, etc.), etc.

In some cases, head motion 315 may include user 310 head rotations, translational head movement, etc. The view 330 of the user 310 may update according to the head motion 315. For example, the user 310 may see view 330-a before the head motion 315. In some cases, after the head motion 315, the user 310 may see view 330-b. The extended reality system (e.g., device 305) may render or update the virtual objects for display as the view 330-a shifts to view 330-b. In some cases, the virtual objects may appear delayed to the user 310 when compared with the real world objects, causing visual conflict. For example, without head motion prediction techniques described herein, updating of virtual objects in view 330-b from view 330-a may be delayed until head pose measurements are conducted such that the position, orientation, sizing, etc. of the virtual objects may be updated accordingly. In some cases, the delay may be due to system latency (e.g., end-to-end system delay), which may be caused by rendering, time warping, or both.

In some cases, such delay may be referred to as a dynamic registration error. In some cases, the error may be large enough that the user 310 may perform a head motion 315 before a time pose measurement may be ready for display. Thus, it may be beneficial to predict head motion 315 such that virtual objects associated with view 330-b may be determined and updated in real-time based on the prediction (e.g., patterns) in the head motion 315. In some cases, the dynamic registration error may be relatively large. For example, with a system delay of 100 milliseconds (ms) and moderate head rotation of 50 degrees per second, the dynamic registration error may be 5 degrees. In some examples, such as a split extended reality architecture, rendering may happen at the network 320. In such examples, the latency of the system may increase. The user 310 may perceive the dynamic registration error as a lag, as virtual objects being misplaced or appearing unnatural, etc.

In some cases, to decrease the dynamic registration error, the device 305 may implement a number of techniques for predicting head motion as described herein. For example, the device 305 may perform predictive tracking to account for the head motion 315 (e.g., a 6 degree of freedom tracking system). In virtual reality applications, the device 305 may implement a pose for the time when eye buffer rendering (e.g., from the head motion 315) is finished. In some cases, the rendering time may vary (e.g., from 16-70 ms). In extended reality applications (e.g., split extended reality), rendering time may be relatively large (e.g., due to rendering operations or processes handled in the edge or server). Thus, pose prediction may reduce rendering time. In some cases, time warp may implement the pose prediction for the time the image becomes visible on a display (e.g., a view 330). For example, the prediction time may be close to 14 ms. Accurate head pose prediction techniques described herein may thus reduce registration error.

In some examples, the system may use a current pose, historical pose data, IMU samples, side channel data, or a combination thereof to predict the head position, head orientation, line of sight (e.g., and thus view 330), etc. of the user 310 for a future time (e.g., a time T, which may be the prediction time) according to a model. In some cases, the prediction time may vary, causing a variable rendering time. In some cases, for example, the model may reliably predict a pose for a prediction interval of 0-100 ms.

In some examples, the model may include a curve fitting pose on a head rate prediction. For example, the model may fit a curve on the past head rate poses as a function of time. The system may predict a future head pose based on the fitted curve. In some cases, the model may be based on a Kalman filter, an extended Kalman filter (EKF), or a combination with higher order derivatives as part of the internal state of the system. In such cases, the model may implement different filters for rotation (e.g., with an EKF model) and translation (e.g., with a Kalman filter model). However, in some cases, higher order derivatives may cause noise in the system. In other examples, the model may be a time series prediction on a pose (e.g., an autoregression (AR), a moving average (MA), or an ARMA model). Such examples may result in a prediction time larger than 50 ms.

In some cases, the system may implement a difference method and exponential smoothing to compute derivatives (the derivative of a bias corrected gyroscopic rotation samples may be angular acceleration, etc.). Additionally or alternatively, the system may damp output using higher order derivatives to reduce pose jitter. Thus, the model used for predicting head pose may be corrected according to Equation 1, where t may refer to an incremental difference in time, T may refer to a future time, or prediction time, P may indicate the head pose prediction model, and A and B may be system constants.

$$\delta P(t, t+T) = \dot{P}(t)T + A\ddot{P}(t)T^2 + B\dddot{P}(t)T^3 + \ldots \qquad \text{Equation 1}$$

In some cases, smoothing coefficients and damping factors may be computed (e.g., offline) using a grid search to increase accuracy of the computed pose (e.g., the mean square error (MSE) may be closer to the actual pose, or ground truth pose). Such an approach may be used for prediction time up to 30-40 ms (e.g., as compared with prediction times larger than 50 ms, which may be desirable).

However, prediction techniques may benefit from taking range of motion into account (e.g., head pose of a user 310 may have a restricted freedom of motion, for example, due to human anatomy and resulting limitations in head movement). The techniques described herein may provide for improved head pose prediction (e.g., by incorporating range of motion, machine learning models, side channel data, etc.). As described herein, extended reality diagram 300 may support the use of techniques for deep learning based head motion prediction for extended reality. More specifically, the described techniques may enable a system to use a deep learning model (e.g., implementing machine learning techniques) to predict a head pose for the user 310. In some cases, the prediction may include a translational head motion 315, a rotational head motion 315, or both. Additionally, when determining the head pose prediction, the head pose prediction techniques may account for application information or data, range of motion limitations, etc.

Figure 4:
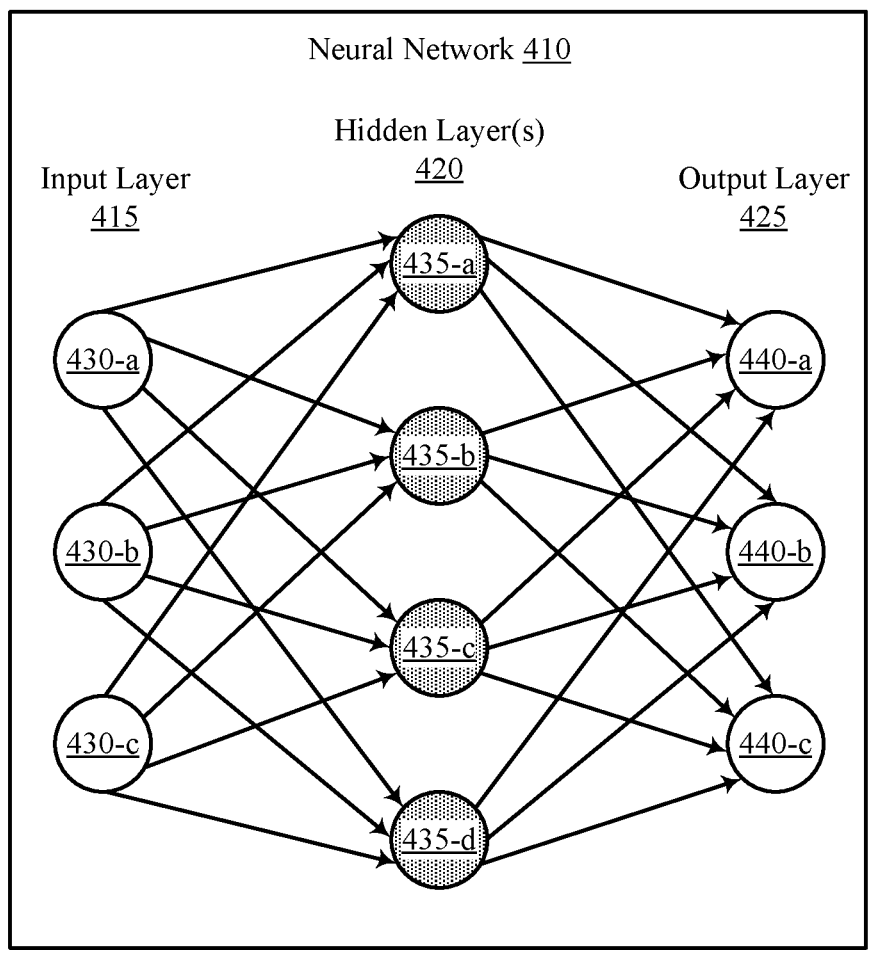
FIG. 4 illustrates an example of a machine learning system that supports deep learning based head motion prediction for extended reality in accordance with aspects of the present disclosure.

FIG. 4 illustrates an example of a machine learning system 400 that supports deep learning based head motion prediction for extended reality in accordance with aspects of the present disclosure. In some examples, machine learning system 400 may implement aspects of wireless communication system 100. For example, machine learning system 400 may include a server 110, which may process data from a database 115 and/or device 105 via machine learning techniques. In some cases, a server 110 may be configured to use machine learning to determine how users are controlling input devices and use sensor information (e.g., sensor statistics associated with a device 105) or information related to an extended reality system (e.g., a virtual reality system, an augmented reality system, or both) to augment the prediction of a head pose. The data from the database 115 may include previously recorded information or current information related to the sensors, the extended reality system (e.g., from past matches or ongoing matches, or both), parameters on range of motion limitations, etc.

The techniques described herein may provide for deep learning based head motion prediction for extended reality. For example, a neural network 410 may implement various machine learning techniques. In some machine learning examples, the network may train a machine learning model on a set of training data. The training data may be a subset of a larger dataset. In some cases, the training may involve determining one or more target features in the dataset. Subsequently, the model may learn the one or more features from the training data (e.g., based on linear regression techniques, such as a linear regression algorithm) and evaluation metrics, such as MSE, precision, accuracy, and recall. In some cases, the evaluation metrics may be calculated according to a loss function. Once the model is trained such that it fits the training data (e.g., based on the determined one or more features), the model may be used on a subset of data from the larger data set that is different from the training data. This subset of data may be referred to as validation data. The validation data set may be used to further tune the model. In some cases, the model may be used for predictions or decisions related to the feature. Examples of the machine learning model may implement techniques such as linear regression, logistic regression, decision tree, support vector machine (SVM), naïve Bayes, k-nearest neighbor, random forest, dimensionality reduction algorithms, gradient boosting algorithms, or any combination thereof.

Some examples of a machine learning model may implement supervised learning techniques as described herein. In some cases, supervised learning techniques may involve the model learning one or more features from a set of training data based on example input-output pairs. That is, a learning function may map an input 430 to an output 440 based on the input-output pairs. The mapping may involve labeled training data based on the presence of one or more features. Supervised machine learning techniques may use classification, regression, or both to learn the one or more features. In some examples, the learning function may implement linear regression, logistic regression, naïve Bayes, any similar learning techniques, or a combination thereof. In some cases, the machine learning model may implement semi-supervised learning techniques in which a portion of the training data may have labels and another portion may not. For example, a small portion of labeled training data may be used in combination with a large portion of unlabeled training data for a learning function. The semi-supervised learning technique may reduce the complexity of the training process (e.g., due to labeling the training data based on features and human supervision).

Some examples of a machine learning model may implement unsupervised learning techniques as described herein. In some cases, unsupervised learning techniques may involve the model learning one or more features from a set of training data based on previously undetected patterns in the data set. In some cases, the unsupervised learning techniques may include grouping, or clustering, the data in the training data set based on commonalities in the data. Additionally or alternatively, the unsupervised learning techniques may include association based on patterns in the training data. Unsupervised learning may implement density estimation in statistics. For example, an unsupervised learning technique may model probability densities over inputs 430. Some possible learning functions may include k-means for clustering related application, Apriori techniques for associated rule related application, any similar learning techniques, or a combination thereof.

Some examples of a machine learning model may implement reinforcement learning techniques as described herein. In some cases, reinforcement learning techniques may implement dynamic programming techniques in which the model may be trained according to feedback and a learning function. For example, the model may use positive or negative feedback to reinforce a value-based reinforcement learning method, a policy-based reinforcement learning method, or a model-based reinforcement learning method. Some examples of reinforcement learning models may include Markov Decision Process, Q learning, any similar learning techniques or models, or a combination thereof.

In some examples, machine learning may be implemented by a deep learning model, such as machine learning system 400. In some cases, the deep learning model may implement a neural network 410, such as an artificial neural network (ANN), which may include an input layer 415, an output layer 425, and one or more hidden layers 420. Each layer may include an interconnected group of artificial neurons (e.g., nodes). For example, the input layer 415 may include nodes 430-*a*, 430-*b*, and 430-*c*. The hidden layer 420 may include nodes 435-*a*, 435-*b*, 435-*c*, and 435-*d*. The output layer 425 may include nodes 440-*a*, 440-*b*, and 440-*c*. The connections between the nodes may be referred to as edges. The edges may be associated with a weight, which may be adjusted during the learning process. In some cases, the weight may correspond to an increase or decrease of the value, or importance, of the node at each layer. The neural network (e.g., the ANN) may be used in applications that involve regression and classification. Some additional implementations of deep learning may include convolutional neural networks, which may be used for computer vision, recurrent neural networks, which may be used for time series analysis, self-organizing maps, which may be used for feature extraction, Boltzmann machines, which may be used for recommendation systems, auto encoders, which may be used for recommendation systems, etc.

In some examples, each layer of the neural network 410 may implement an activation function that may correspond to one or more features in a set of data. The activation function may convert an input signal for a node to an output signal. The output signal may be used in the next layer of the neural network (e.g., for an ANN). The activation function may correspond to whether the node may be activated based on calculating the weighted sum of the node and adding bias, which may introduce non-linearity to the output of the node. In some cases, the activation function may implement a threshold activation function (e.g., a binary step function). In such cases, if the input value for a node is above or below a threshold value, the node may be activated. The node may send the signal to the next layer. In some cases, the activation function may implement a sigmoid activation function (e.g., a logistic function) to predict a probability as an output. In some examples, the activation function may implement rectified linear units (ReLu).

In some cases, the neural network 410 may implement activation functions for each additional layer of the network (e.g., for hidden layers 420 between the input layer 415 and the output layer 425). The neural network 410 may also implement a loss function, or cost function, based on the difference between an actual value and a predicted value. For each layer of the neural network 410, the cost function may be used to adjust the weights for the next input. In some examples, the cost function, or loss function, may implement an MSE function, which may calculate the square of the difference between the actual value and the predicted value. Once the neural network 410 has been trained (e.g., based on the activation function and adjusting the weights), the neural network 410 may be used for pattern classification, prediction (e.g., for financial analysis), control and optimization (e.g., calibration), or combination thereof.

In some examples, inputs 430 to the machine learning model, or neural network 410 (e.g., at input layer 415), may include data from the extended reality system (e.g., statistics related to gameplay, real-time parameters related to future action, or a combination) or sensor statistics, or both, for one or more users (e.g., the first user from a group of users or the second user from the group of users, or both). In some cases, inputs 430 to the machine learning model (e.g., inputs 430 to the machine learning algorithm) may include IMU samples. In some cases, inputs 430 to the machine learning algorithm may include side channel data paired with sensor statistics. In some cases, the machine learning model 400 may be trained online on game/application data (e.g., the machine learning model 400 may be able to learn the game/application specific pattern to predict head pose better). In some examples, the last 1-2 fully connected layers (e.g., of hidden layers 420) of machine learning model 400 may be trained for samples with high prediction error.

An output 440 of the machine learning model may include a predicted head pose (e.g., based on an input 430 of sensors statistics such as one or more IMU measurements). For example, the machine learning techniques may include a model or flow diagram that predicts user head pose based on inputs 430 of sensor measurements, side channel data, etc. As discussed herein, one or more aspects of machine learning system 400 may be implemented to predict user head pose (e.g., at a future time T) for improved generation, rendering, display, etc. of virtual objects (e.g., such that the virtual objects may be visible by the user at a time T in accordance with the user's predicted head pose at the time T).

Figure 5:
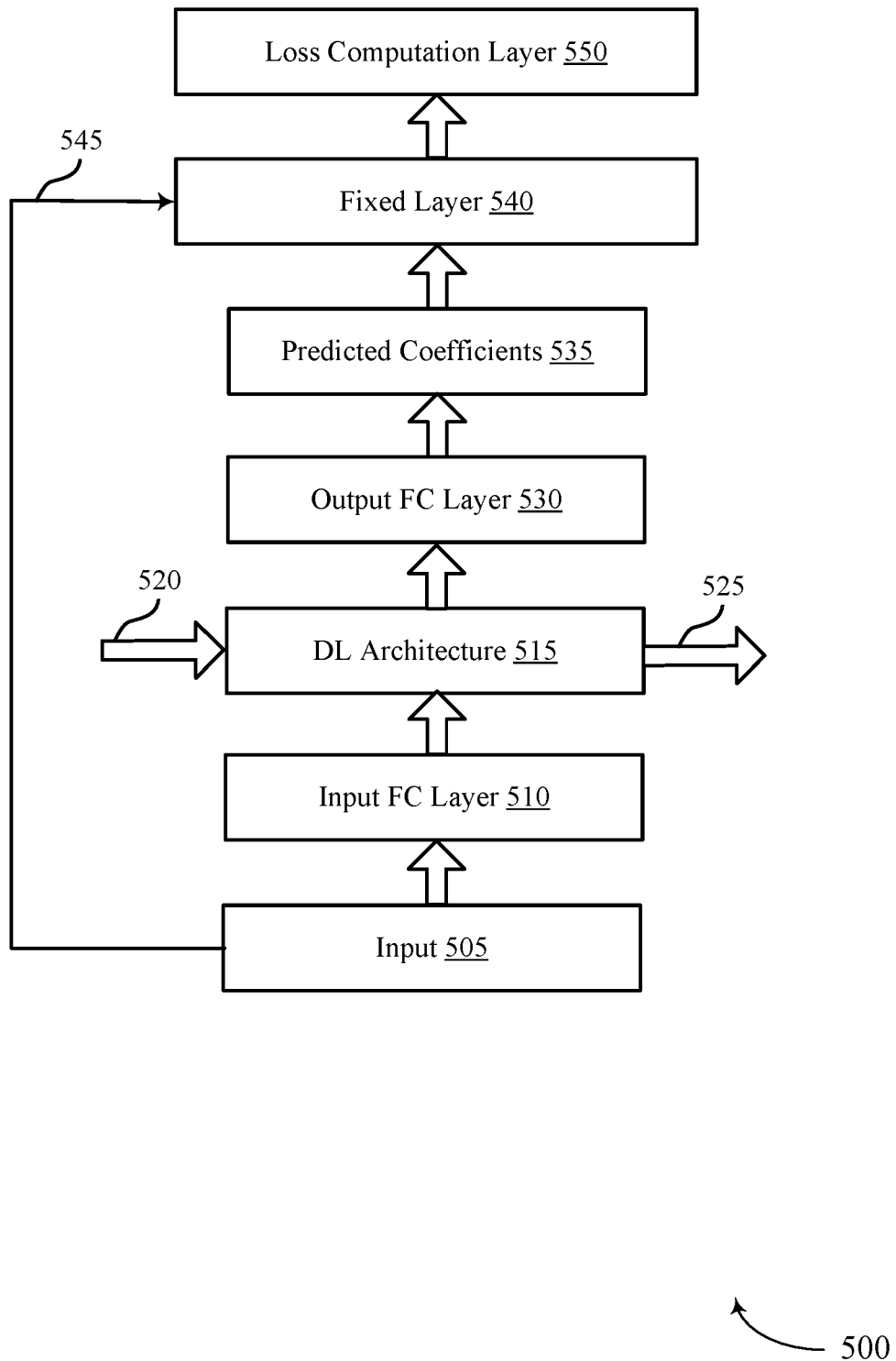
FIG. 5 illustrates an example of a flow diagram that supports deep learning based head motion prediction for extended reality in accordance with aspects of the present disclosure.

FIG. 5 illustrates an example of a flow diagram 500 (e.g., a model) that supports deep learning based head motion prediction for extended reality in accordance with aspects of the present disclosure. In some examples, flow diagram 500 may implement aspects of wireless communication system 100, device 200, extended reality diagram 300, and machine learning system 400. In some cases, flow diagram 500 may include input 505 and fully connected layers 510 and 530, which may be examples of input 430 and hidden layers 420 as described with reference to FIG. 4. As described herein, a device 105, a device 200, or a device 305 as described with reference to FIGS. 1-3, may implement one or more aspects of flow diagram 500 to predict head pose and/or head motion (e.g., head motion 315) based on deep learning. For example, the device 105 or 305 may input values, such as sensor statistics associated with the deice 105 (e.g., IMU samples), to the flow diagram 500.

In some cases, the flow diagram 500 may use deep learning techniques, as well as the input 505, to determine a pose prediction. In some cases, the flow diagram 500 may have one or more layers, which may correspond to one or more functions. For example, the flow diagram 500 may use the input 505 (e.g., at input FC layer 510) to model head pose as a polynomial over the predicted time interval. Generally, one or more aspects of the flow diagram 500 may be implemented to determine coefficients for a future relative head pose prediction function, to predict a future relative head pose, etc. For example, in some cases, one or more aspects of the flow diagram 500 may implement machine learning (e.g., that accounts for side channel data, IMU measurements, etc.) to derive a prediction model or prediction function for estimating future relative head pose (e.g., at some time T, which may thus be used for virtual object generation, rendering, display, etc. at various times T).

In some examples, the flow diagram 500 may implement a Taylor series approximation using an se3_exp( ) function, as shown in Equation 2, to predict the relative head pose, where T is the prediction time.

$$\widehat{\delta P}_{(t,t+T)} = se3\_exp(a(t)T + b(t)T^2 + c(t)T^3 + \ldots) \quad \text{Equation 2}$$

In some cases, the device may use one or more layers of flow diagram 500 to determine the coefficients a(t), b(t), and c(t) and the degree of the polynomial. For example, layer 510 may be a fully connected layer. The input 505 may be passed through the fully connected layer 510. The fully connected layer 510 may convert the input 505 (e.g., the IMU samples) into a higher dimensional vector. Then, the higher dimensional vector may be passed into a deep learning architecture at layer 515. In some cases, the flow diagram 500 may implement a long short-term memory (LSTM) based architecture at layer 515 if the input 505 is sequential. The LSTM based architecture may use the higher dimensional vector from layer 510, a history of past sensor statistics 520 (e.g., the IMU samples, $h_{in}$), or both. The output (e.g., $h_{out}$) of the LSTM architecture at layer 515 may be saved at 525 (e.g., to be applied to the next input) and may be passed through a fully connected layer 530. The fully connected layer 530 may convert the output of the LSTM at layer 515 to predicted coefficients of the flow diagram 500, such as predicted coefficient 535 (e.g., coefficients a(t), b(t), and c(t)).

In some cases, once the flow diagram 500 has the predicted coefficients 535 and the prediction time, T, the polynomial at Equation 2 may be used at fixed layer 540 to determine the predicted head pose (e.g., corresponding to the input 505, shown at 545). In some cases, the approximation may have a low degree polynomial if the prediction time is relatively short (e.g., if head pose is to be predicted relatively near future, or at smaller times T). In other cases, the approximation may have a higher degree (e.g., higher order) polynomial if the prediction time is relatively long (e.g., if head pose is to be predicted relatively further future, or at larger times T). In some cases, a network 120, as described with reference to FIG. 1, may be trained by computing a loss at loss computation layer 550, which may be the difference between the predicted pose from fixed layer 540 and a ground truth pose (e.g., the pose from training data). In some cases, the flow diagram 500 may propagate the loss at loss computation layer 550 to the network 120 (e.g., to train the flow diagram 500).

In some examples, the flow diagram 500 may use an se(3) function to predict translation, rotation, or both for the head pose. For example, a rotational model may have 3 parameters related to a unit rotational axis ($\hat{\omega}$) and an angle of rotation ($\theta$). Additionally or alternatively, a translational model may have 3 parameters. Both the rotational model and the translational model combined may define a screw axis.

Rotation, translation, or both around the screw axis may correspond to rigid body motion in three dimensions.

In some cases, the flow diagram 500 may use bias corrected IMU coefficients to determine the predicted head pose. For example, the flow diagram 500 may use Equation 3 as input to the deep learning architecture layer 515 (e.g., an LSTM architecture), where $\omega^b(t)$ is the angular velocity in a body frame, $\omega^g(t)$ is the angular velocity in a gyroscope frame, $R_{bg}$ is the relative orientation between the body and the gyroscope, $b_g$ is the gyroscope bias, $b_a$ is the accelerometer bias, $A_g$ and $A_a$ are non-orthogonality and scale factors, $\alpha^b(t)$ is linear acceleration in the body frame, and $y^b$ is gravity in the body frame.

$$\omega^b(t)=R_{bg}A_g^{-1}(\omega^g(t)-b_g), \alpha^b(t)=A_a^{-1}(y_{acc}^b(t)-b_a) \quad \text{Equation 3}$$

Equation 3 may correspond to bias corrected acceleration and gyroscopic samples. In some cases, given the history of sensor statistics 520 (e.g., corresponding to a hidden state) and the input from Equation 3 (e.g., ($\omega^g(t)$, $\alpha^b(t)$)), the relative time pose (e.g., in se(3) for a prediction time T) may be computed according to Equation 4. For examples, Equation 4 may be used (e.g., by a network) to predict coefficients $a_r(t)$ for rotation and translation at a time, t.

$$\widehat{\delta P}_{(t,t+T)}=a(t)T+b(t)T^2+c(t)T^3+\ldots \quad \text{Equation 4}$$

In some cases, the loss function at loss computation layer 550 may be calculated according to an MSE loss of a relative pose over a time interval (e.g., 100 ms). For example, if there are 10 samples over the prediction time of 100 ms, the average MSE may be computed over all the samples with respect to the ground truth pose in se(3) (e.g., by computing the L2 norm of the change in pose in se(3)). Additionally, the loss function may have a term that accounts for jitter.

In some cases, the flow diagram 500 may include uncertainty in the prediction. For example, the uncertainty may be included as a function of the prediction error. In some cases, if the prediction error is lower, there may be a direct correlation with uncertainty. The prediction uncertainty may be used to infer information related to rendering and processing time. In some cases, if the uncertainty is low, then the extra rendering will be relatively low as well. That is, in some cases extra rendering may occur to compensate for pose prediction error, so if the pose prediction error is relatively low, the uncertainty may be low as well. Thus, prediction uncertainty may be used to determine the amount of extra rendering.

In some cases side information, such as application information or data associated with the extended reality system, may be used in addition, or as an alternative, to train or update the flow diagram 500. For example, the machine learning based pose prediction (e.g., the prediction generated by flow diagram 500) may learn the pattern in head pose motion. In some cases, the flow diagram 500 may account for the limited range of motion of a human head (e.g., limited degree of rotation, restricted freedom, etc.). In some cases, sudden changes in head position or head motion may cause uncertainty in the model. Thus, it may be beneficial to use the application information or data to predict the sudden change.

In some cases, the application information or data may correspond to a game, or application, content. There may be an event (e.g., in a game) that may cause a sudden change of head position at a user. The application information or data may be used to determine whether the user may likely change head position. Similarly, the flow diagram 500 may use eye gaze tracking data to figure out what the user may be looking at, then use that information to predict a sudden change in head position. For example, if the user is chasing or tracking a moving ball in augmented reality, then if the rendered ball changes directions, the head pose of the user may also change directions to follow the ball. Additionally or alternatively, the flow diagram 500 may use body pose estimation output to determine capabilities related to range of human motion. In some cases, the flow diagram 500 may implement posture detection and use the results to determine a range of motion. For example, if a user is sitting in a chair, the range of motion for the head pose may be different than standing up. In some examples, audio data may be used to determine, or predict, user head pose or head movement (e.g., rotationally towards a source of a sound). In some examples, using the application information or data may improve the accuracy of the head pose prediction (e.g., for sudden changes in head pose).

In some examples, the deep learning based pose prediction model trained on offline data (e.g., trained based on flow diagram 500) may additionally be trained with application information or data. In such examples, the flow diagram 500 may account for patterns related to an application or game, which may correspond to improved accuracy in the pose prediction. In some cases, the flow diagram 500 may implement the application information or data for training towards the end of the training process. For example, the flow diagram 500 may use the application information or data in a fully connected layer (e.g., the last one or two fully connected layers, such as fully connected layer 530) for input with high prediction error. That is, the application information or data may be indirectly incorporated into the flow diagram 500. Thus, models for different applications (e.g., games) may differ according to the content or pattern in the application.

In some cases, the deep learning based pose prediction model may directly incorporate application information or data for pose prediction. For example, the input 505 may include the information or data for pose prediction in addition to sensor statistics (e.g., a game application state and the IMU samples). The deep learning base pose prediction model may directly incorporate application information or data, indirectly incorporate application information or data, or both. In some cases, a system may use the outputs from the deep learning based pose prediction model (e.g., flow diagram 500) and application information or data as input to a linear regression model. The weights of the deep learning model may correspond to one or more learning techniques or models. In some examples, the system may use uncertainty to determine whether to incorporate application information or data. For example, if the uncertainty of the deep learning based pose prediction model (e.g., flow diagram 500) is high, then the system may use the application information or data (e.g., a game state) to predict head pose. If the uncertainty of the deep learning based pose prediction model is low, then the system may not use the application information or data in the model.

Figure 6:
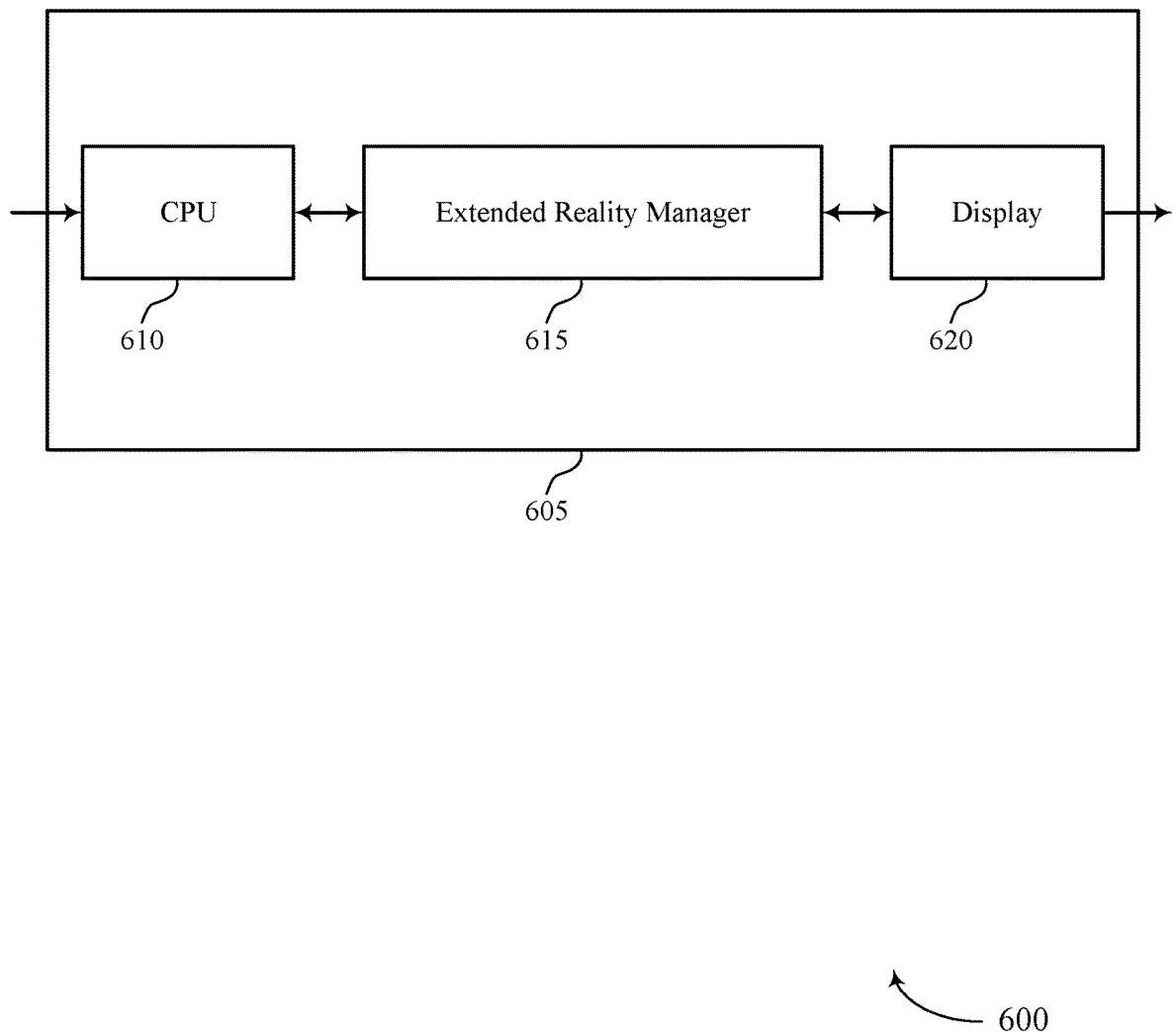
FIGS. 6 and 7 show block diagrams of devices that support deep learning based head motion prediction for extended reality in accordance with aspects of the present disclosure.

FIG. 6 shows a block diagram 600 of a device 605 that supports deep learning based head motion prediction for extended reality in accordance with aspects of the present disclosure. The device 605 may be an example of aspects of a GPU as described herein. The device 605 may include a sensor 610, an extended reality manager 615, and a display 620. The device 605 may also include a processor. Each of these components may be in communication with one another (e.g., via one or more buses).

The one or more sensors 610 (e.g., image sensors, cameras, IMUS, eye trackers, accelerometers, heart rate sensors, etc.) may receive information (e.g., light, force, angular rate, orientation, etc.), which may be passed on to other components of the device 605. In some cases, the sensors 610 may be an example of aspects of the I/O controller 915 described with reference to FIG. 9. A sensor 610 may include or be an example of a sensor for sensing user behavior associated with at least one of a computing device, a peripheral, an input device, a display, a touchscreen, an application running on a computing device, or any combination thereof. A sensor 610 may utilize one or more elements that have a sensitivity to acceleration, mass, electromagnetism, or location to receive information, and the information may then be passed on to other components of the device 605.

The extended reality manager 615 may train one or more layers of a machine learning network based on application data associated with the extended reality system and an estimated head motion range associated with the extended reality system, receive one or more bias corrected inertial measurement unit measurements based on a sensor, model a relative head pose of the user as a polynomial of time over a prediction interval based on the one or more bias corrected inertial measurement unit measurements and the trained one or more layers, and determine a future relative head pose of the user based on the polynomial. The extended reality manager 615 may be an example of aspects of the extended reality manager 910 described herein.

The extended reality manager 615, or its sub-components, may be implemented in hardware, code (e.g., software or firmware) executed by a processor, or any combination thereof. If implemented in code executed by a processor, the functions of the extended reality manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The extended reality manager 615, or its sub-components, may be physically located at various positions, including being distributed such that portions of functions are implemented at different physical locations by one or more physical components. In some examples, the extended reality manager 615, or its sub-components, may be a separate and distinct component in accordance with various aspects of the present disclosure. In some examples, the extended reality manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Display 620 may display content generated by other components of the device. Display 620 may be an example of display 245 and/or a display 735 as described with reference to FIGS. 2 and 9. In some examples, display 620 may be connected with a display buffer which stores rendered data until an image is ready to be displayed (e.g., as described with reference to FIG. 9. The display 620 may illuminate according to signals or information generated by other components of the device 605. For example, the display 620 may receive display information (e.g., pixel mappings, display adjustments) from extended reality manager 615, and may illuminate accordingly. The display 620 may represent a unit capable of displaying video, images, text or any other type of data for consumption by a viewer. Display 620 may include a liquid-crystal display (LCD), a light emitting diode (LED) display, an organic LED (OLED), an active-matrix OLED (AMOLED), or the like. In some cases, display 620 and an I/O controller (e.g., I/O controller 915) may be or represent aspects of a same component (e.g., a touchscreen) of device 605.

Figure 7:
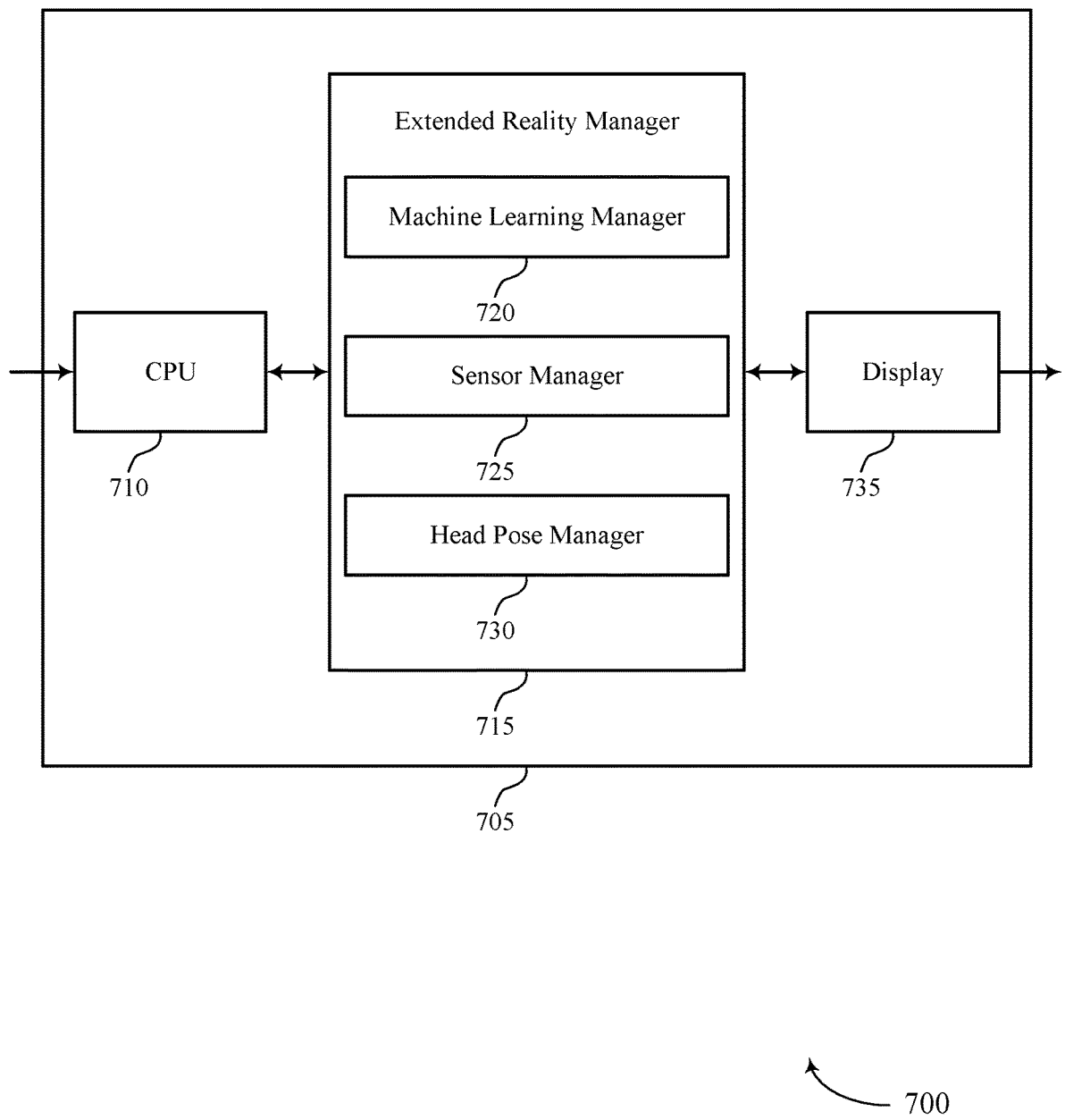

FIG. 7 shows a block diagram 700 of a device 705 that supports deep learning based head motion prediction for extended reality in accordance with aspects of the present disclosure. The device 705 may be an example of aspects of a device 605 or a GPU 115 as described herein. The device 705 may include a sensor 710, an extended reality manager 715, and a display 735. The device 705 may also include a processor. Each of these components may be in communication with one another (e.g., via one or more buses).

The one or more sensors 710 (e.g., image sensors, cameras, IMUS, eye trackers, accelerometers, heart rate sensors, etc.) may receive information (e.g., light, force, angular rate, orientation, etc.), which may be passed on to other components of the device 705. In some cases, the sensors 710 may be an example of aspects of the I/O controller 915 described with reference to FIG. 9. A sensor 710 may include or be an example of a sensor for sensing user behavior associated with at least one of a computing device, a peripheral, an input device, a display, a touchscreen, an application running on a computing device, or any combination thereof. A sensor 710 may utilize one or more elements that have a sensitivity to acceleration, mass, electromagnetism, or location to receive information, and the information may then be passed on to other components of the device 705.

The extended reality manager 715 may be an example of aspects of the extended reality manager 615 as described herein. The extended reality manager 715 may include a machine learning manager 720, a sensor manager 725, and a head pose manager 730. The extended reality manager 715 may be an example of aspects of the extended reality manager 910 described herein.

The machine learning manager 720 may train one or more layers of a machine learning network based on application data associated with the extended reality system and an estimated head motion range associated with the extended reality system. The sensor manager 725 may receive one or more bias corrected inertial measurement unit measurements based on a sensor. The head pose manager 730 may model a relative head pose of the user as a polynomial of time over a prediction interval based on the one or more bias corrected inertial measurement unit measurements and the trained one or more layers and determine a future relative head pose of the user based on the polynomial.

Display 735 may display content generated by other components of the device. Display 735 may be an example of display 35 as described with reference to FIG. 9. In some examples, display 735 may be connected with a display buffer which stores rendered data until an image is ready to be displayed (e.g., as described with reference to FIG. 9. The display 735 may illuminate according to signals or information generated by other components of the device 705. For example, the display 735 may receive display information (e.g., pixel mappings, display adjustments) from extended reality manager 715, and may illuminate accordingly. The display 735 may represent a unit capable of displaying video, images, text or any other type of data for consumption by a viewer. Display 735 may include a LCD, a LED display, an OLED, an AMOLED, or the like. In some cases, display 735 and an I/O controller (e.g., I/O controller 915) may be or represent aspects of a same component (e.g., a touchscreen) of device 705.

Figure 8:
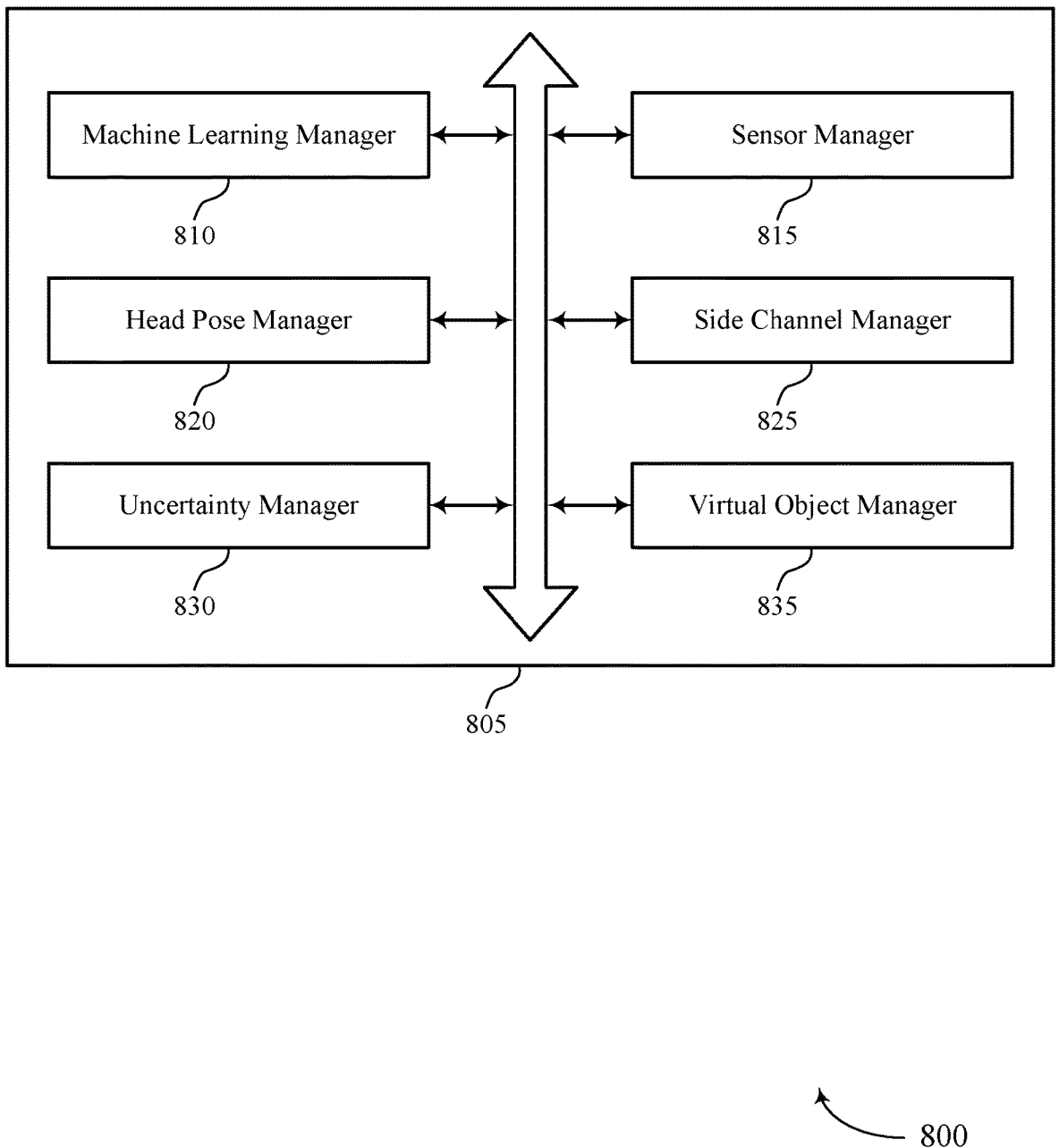
FIG. 8 shows a block diagram of an extended reality manager that supports deep learning based head motion prediction for extended reality in accordance with aspects of the present disclosure.

FIG. 8 shows a block diagram 800 of an extended reality manager 805 that supports deep learning based head motion prediction for extended reality in accordance with aspects of the present disclosure. The extended reality manager 805 may be an example of aspects of an extended reality manager 615, an extended reality manager 715, or an extended reality manager 910 described herein. The extended reality manager 805 may include a machine learning manager 810, a sensor manager 815, a head pose manager 820, a side channel manager 825, an uncertainty manager 830, and a virtual object manager 835. Each of these modules may communicate, directly or indirectly, with one another (e.g., via one or more buses).

The machine learning manager 810 may train one or more layers of a machine learning network based on application data associated with the extended reality system and an estimated head motion range associated with the extended reality system. In some examples, the machine learning manager 810 may train the one or more layers on-line using the application data, eye gaze tracking data, estimated body pose data, posture detection data, or some combination thereof. In some examples, the machine learning manager 810 may input the one or more bias corrected inertial measurement unit measurements into a long short-term memory architecture of the machine learning network, where the polynomial is modeled based on the one or more bias corrected inertial measurement unit measurements input into the long short-term memory architecture. In some cases, the one or more layers are trained on-line based on a prediction error associated with the machine learning network. In some cases, the estimated head motion range is based on estimated head pose limitations of the user, the application data, or both.

The sensor manager 815 may receive one or more bias corrected inertial measurement unit measurements based on a sensor.

The head pose manager 820 may model a relative head pose of the user as a polynomial of time over a prediction interval based on the one or more bias corrected inertial measurement unit measurements and the trained one or more layers. In some examples, the head pose manager 820 may determine a future relative head pose of the user based on the polynomial. In some examples, the head pose manager 820 may determine a weighted combination of the polynomial and the side channel data, where the future relative head pose is based on the weighted combination. In some examples, the head pose manager 820 may determine a degree of the polynomial, one or more coefficients of the polynomial, or both, based on a length of the prediction interval.

In some examples, the head pose manager 820 may determine a future time for the future relative head pose determination, where the future relative head pose determination is based on the polynomial and the determined future time. In some cases, a weighting of the side channel data in the weighted combination increases as the uncertainty of the polynomial increases. In some cases, the degree of the polynomial increases as the length of the prediction interval increases. In some cases, the future relative head pose includes a relative head pose rotation at the future time and a relative head pose translation at the future time.

The side channel manager 825 may determine side channel data based on the user, the application data, or both, where the future relative head pose is determined based on the side channel data and the polynomial. In some cases, the side channel data includes virtual object data, future virtual object data, sound data, future sound data, eye gaze tracking data, or some combination thereof.

The uncertainty manager 830 may model uncertainty of the polynomial based on a prediction error associated with the machine learning network.

The virtual object manager 835 may determine a relative display position for one or more virtual objects based on the future relative head pose of the user. In some examples, the virtual object manager 835 may display the one or more virtual objects based on the relative display position.

Figure 9:
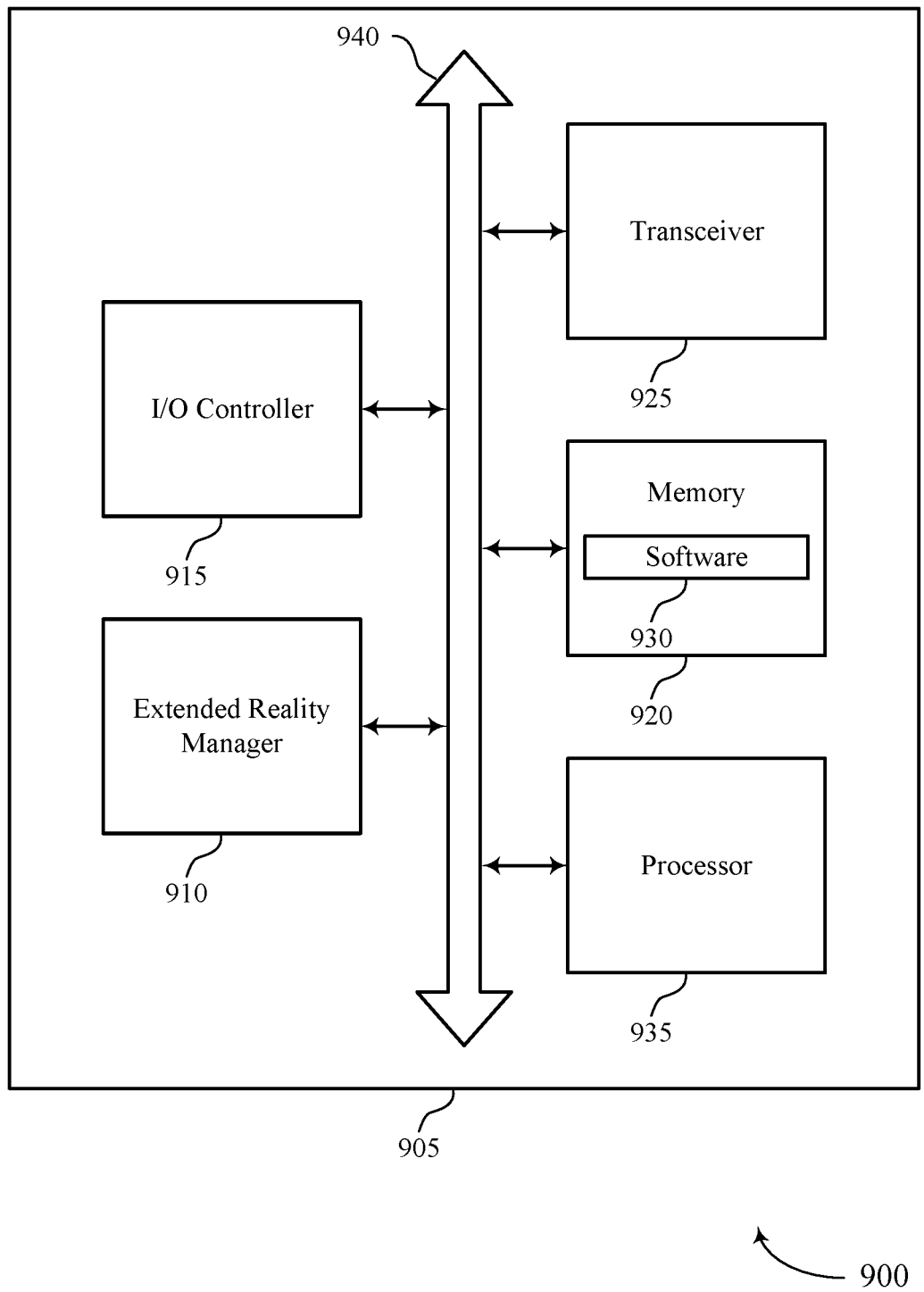
FIG. 9 shows a diagram of a system including a device that supports deep learning based head motion prediction for extended reality in accordance with aspects of the present disclosure.

FIG. 9 shows a diagram of a system 900 including a device 905 that supports deep learning based head motion prediction for extended reality in accordance with aspects of the present disclosure. The device 905 may be an example of or include the components of device 605, device 705, or a GPU as described herein. The device 905 may include components for bi-directional voice and data communications including components for transmitting and receiving communications, including an extended reality manager 910, an I/O controller 915, memory 920, a transceiver 925, and a processor 935. These components may be in electronic communication via one or more buses (e.g., bus 940).

The extended reality manager 910 may train one or more layers of a machine learning network based on application data associated with the extended reality system and an estimated head motion range associated with the extended reality system, receive one or more bias corrected inertial measurement unit measurements based on a sensor, model a relative head pose of the user as a polynomial of time over a prediction interval based on the one or more bias corrected inertial measurement unit measurements and the trained one or more layers, and determine a future relative head pose of the user based on the polynomial.

I/O controller 915 may manage input and output signals for device 905. I/O controller 915 may also manage peripherals not integrated into device 905. In some cases, I/O controller 915 may represent a physical connection or port to an external peripheral. In some cases, I/O controller 915 may utilize an operating system such as iOS®, ANDROID®, MS-DOS®, MS-WINDOWS®, OS/2®, UNIX®, LINUX®, or another known operating system. In other cases, I/O controller 915 may represent or interact with a modem, a keyboard, a mouse, a touchscreen, or a similar device. In some cases, I/O controller 915 may be implemented as part of a processor. In some cases, a user may interact with device 905 via I/O controller 915 or via hardware components controlled by I/O controller 915.

The memory 920 may include RAM and ROM. The memory 920 may store computer-readable, computer-executable code or software 930 including instructions that, when executed, cause the processor to perform various functions described herein. In some cases, the memory 920 may contain, among other things, a BIOS which may control basic hardware or software operation such as the interaction with peripheral components or devices.

The transceiver 925 may communicate bi-directionally, via one or more antennas, wired, or wireless links as described above. For example, the transceiver 925 may represent a wireless transceiver and may communicate bi-directionally with another wireless transceiver. The transceiver 925 may also include a modem to modulate the packets and provide the modulated packets to the antennas for transmission, and to demodulate packets received from the antennas.

The software 930 may include instructions to implement aspects of the present disclosure, including instructions to support predicting head pose of a user in an extended reality system. The software 930 may be stored in a non-transitory computer-readable medium such as system memory or other type of memory. In some cases, the software 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 920) to cause the device 905 to perform various functions (e.g., functions or tasks supporting deep learning based head motion prediction for extended reality).

Figure 10:
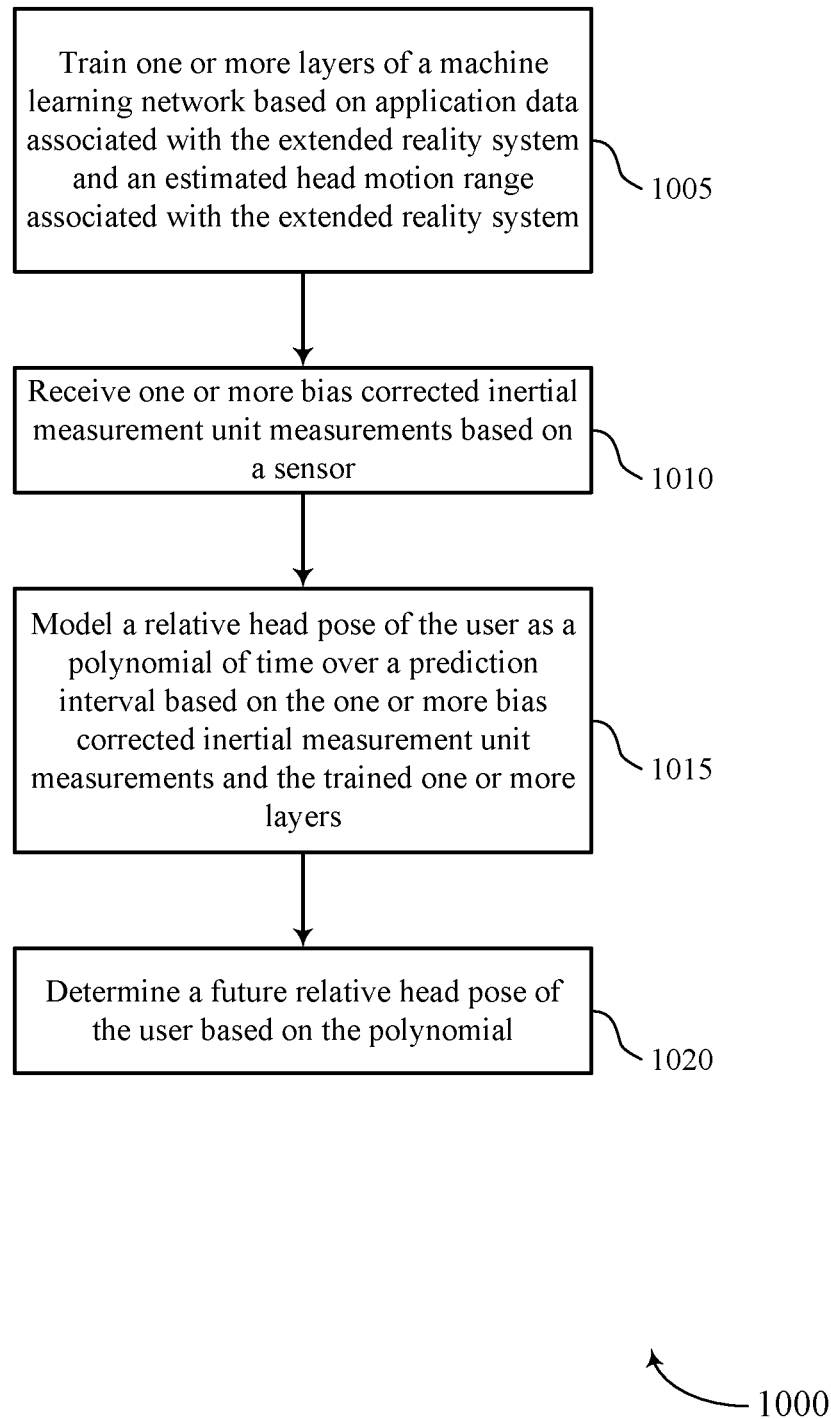
FIGS. 10 and 11 show flowcharts illustrating methods that support deep learning based head motion prediction for extended reality in accordance with aspects of the present disclosure.

FIG. 10 shows a flowchart illustrating a method 1000 that supports deep learning based head motion prediction for extended reality in accordance with aspects of the present disclosure. The operations of method 1000 may be implemented by a GPU or its components as described herein. For example, the operations of method 1000 may be performed by an extended reality manager as described with reference to FIGS. 6 through 9. In some examples, a GPU may execute a set of instructions to control the functional elements of the GPU to perform the functions described below. Additionally or alternatively, a GPU may perform aspects of the functions described below using special-purpose hardware.

At 1005, the GPU may train one or more layers of a machine learning network based on application data associated with the extended reality system and an estimated head motion range associated with the extended reality system. The operations of 1005 may be performed according to the methods described herein. In some examples, aspects of the operations of 1005 may be performed by a machine learning manager as described with reference to FIGS. 6 through 9.

At 1010, the GPU may receive one or more bias corrected inertial measurement unit measurements based on a sensor. The operations of 1010 may be performed according to the methods described herein. In some examples, aspects of the operations of 1010 may be performed by a sensor manager as described with reference to FIGS. 6 through 9.

At 1015, the GPU may model a relative head pose of the user as a polynomial of time over a prediction interval based on the one or more bias corrected inertial measurement unit measurements and the trained one or more layers. The operations of 1015 may be performed according to the methods described herein. In some examples, aspects of the operations of 1015 may be performed by a head pose manager as described with reference to FIGS. 6 through 9.

At 1020, the GPU may determine a future relative head pose of the user based on the polynomial. The operations of 1020 may be performed according to the methods described herein. In some examples, aspects of the operations of 1020 may be performed by a head pose manager as described with reference to FIGS. 6 through 9.

Figure 11:
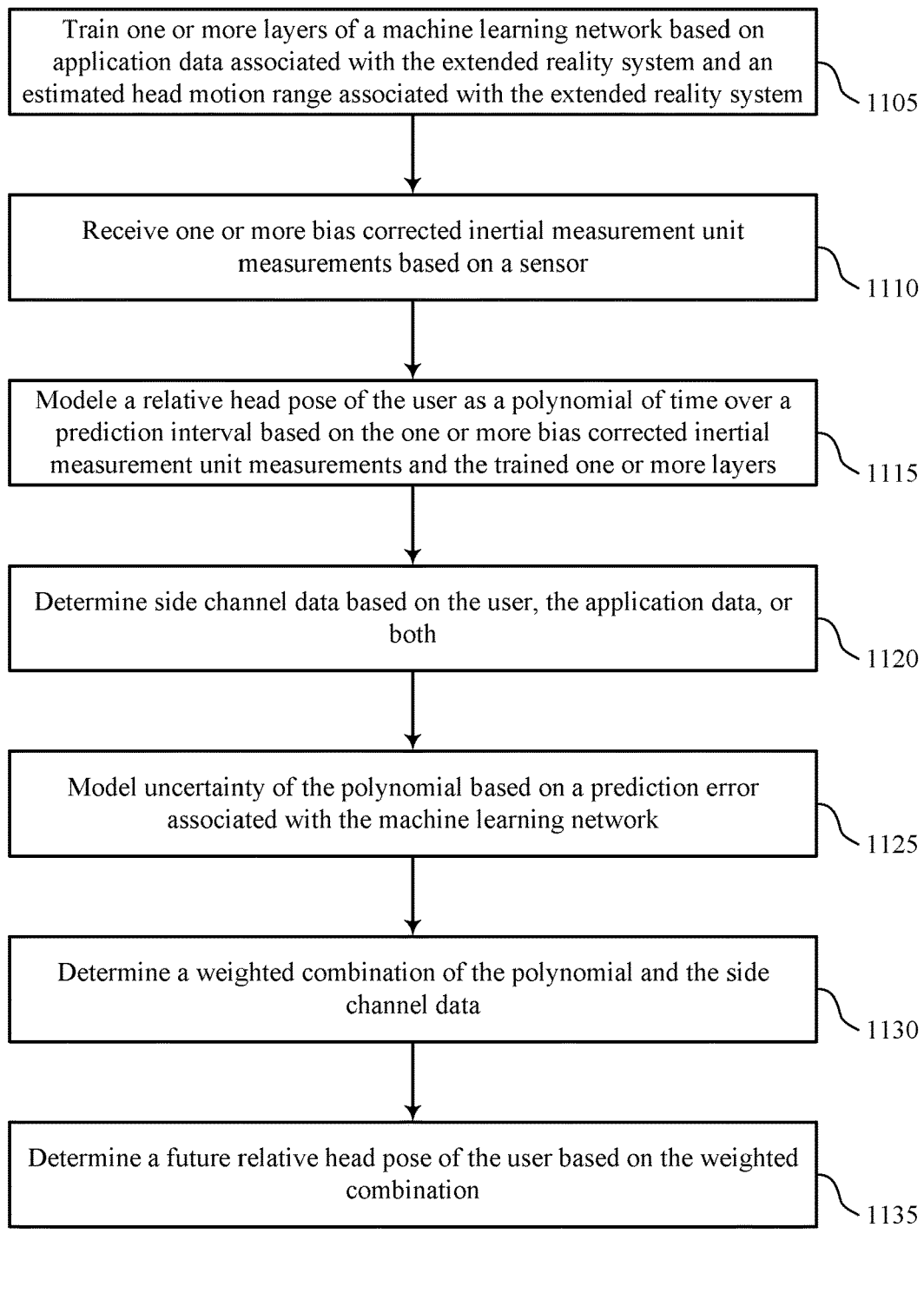

FIG. 11 shows a flowchart illustrating a method 1100 that supports deep learning based head motion prediction for extended reality in accordance with aspects of the present disclosure. The operations of method 1100 may be implemented by a GPU or its components as described herein. For example, the operations of method 1100 may be performed by an extended reality manager as described with reference to FIGS. 6 through 9. In some examples, a GPU may execute a set of instructions to control the functional elements of the GPU to perform the functions described below. Additionally or alternatively, a GPU may perform aspects of the functions described below using special-purpose hardware.

At 1105, the GPU may train one or more layers of a machine learning network based on application data associated with the extended reality system and an estimated head motion range associated with the extended reality system. The operations of 1105 may be performed according to the methods described herein. In some examples, aspects of the operations of 1105 may be performed by a machine learning manager as described with reference to FIGS. 6 through 9.

At 1110, the GPU may receive one or more bias corrected inertial measurement unit measurements based on a sensor. The operations of 1110 may be performed according to the methods described herein. In some examples, aspects of the operations of 1110 may be performed by a sensor manager as described with reference to FIGS. 6 through 9.

At 1115, the GPU may model a relative head pose of the user as a polynomial of time over a prediction interval based on the one or more bias corrected inertial measurement unit measurements and the trained one or more layers. The operations of 1115 may be performed according to the methods described herein. In some examples, aspects of the operations of 1115 may be performed by a head pose manager as described with reference to FIGS. 6 through 9.

At 1120, the GPU may determine side channel data based on the user, the application data, or both. The operations of 1120 may be performed according to the methods described herein. In some examples, aspects of the operations of 1120 may be performed by a side channel manager as described with reference to FIGS. 6 through 9.

At 1125, the GPU may model uncertainty of the polynomial based on a prediction error associated with the machine learning network. The operations of 1125 may be performed according to the methods described herein. In some examples, aspects of the operations of 1125 may be performed by an uncertainty manager as described with reference to FIGS. 6 through 9.

At 1130, the GPU may determine a weighted combination of the polynomial and the side channel data. The operations of 1130 may be performed according to the methods described herein. In some examples, aspects of the operations of 1130 may be performed by a head pose manager as described with reference to FIGS. 6 through 9.

At 1135, the GPU may determine a future relative head pose of the user based on the weighted combination (e.g., based on the side channel data, the polynomial, the uncertainty, etc.). The operations of 1135 may be performed according to the methods described herein. In some examples, aspects of the operations of 1135 may be performed by a head pose manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of predicting head pose of a user in an extended reality system, comprising:
   training one or more layers of a machine learning network based at least in part on application data associated with the extended reality system and an estimated head motion range associated with the extended reality system;
   receiving one or more bias corrected inertial measurement unit measurements based at least in part on a sensor;
   modeling a relative head pose of the user as a polynomial of time over a prediction interval based at least in part on the one or more bias corrected inertial measurement unit measurements and the trained one or more layers; and
   determining a future relative head pose of the user based at least in part on the polynomial.

2. The method of claim 1, wherein training the one or more layers of the machine learning network comprises:
   training the one or more layers on-line using the application data, eye gaze tracking data, estimated body pose data, posture detection data, or some combination thereof.

3. The method of claim 2, wherein the one or more layers are trained on-line based at least in part on a prediction error associated with the machine learning network.

4. The method of claim 1, further comprising:
   determining side channel data based at least in part on the user, the application data, or both, wherein the future relative head pose is determined based at least in part on the side channel data and the polynomial.

5. The method of claim 4, further comprising:
modeling uncertainty of the polynomial based at least in part on a prediction error associated with the machine learning network; and
determining a weighted combination of the polynomial and the side channel data, wherein the future relative head pose is based at least in part on the weighted combination.

6. The method of claim 5, wherein a weighting of the side channel data in the weighted combination increases as the uncertainty of the polynomial increases.

7. The method of claim 4, wherein the side channel data comprises virtual object data, future virtual object data, sound data, future sound data, eye gaze tracking data, or some combination thereof.

8. The method of claim 1, wherein modeling the relative head pose of the user as the polynomial of time over the prediction interval comprises:
determining a degree of the polynomial, one or more coefficients of the polynomial, or both, based at least in part on a length of the prediction interval.

9. The method of claim 8, wherein the degree of the polynomial increases as the length of the prediction interval increases.

10. The method of claim 1, further comprising:
inputting the one or more bias corrected inertial measurement unit measurements into a long short-term memory architecture of the machine learning network, wherein the polynomial is modeled based at least in part on the one or more bias corrected inertial measurement unit measurements input into the long short-term memory architecture.

11. The method of claim 1, further comprising:
determining a future time for the future relative head pose determination, wherein the future relative head pose determination is based at least in part on the polynomial and the determined future time.

12. The method of claim 11, wherein the future relative head pose comprises a relative head pose rotation at the future time and a relative head pose translation at the future time.

13. The method of claim 1, wherein the estimated head motion range is based at least in part on estimated head pose limitations of the user, the application data, or both.

14. The method of claim 1, further comprising:
determining a relative display position for one or more virtual objects based at least in part on the future relative head pose of the user; and
displaying the one or more virtual objects based at least in part on the relative display position.

15. An apparatus for predicting head pose of a user in an extended reality system, comprising:
a processor,
memory coupled with the processor; and
instructions stored in the memory and executable by the processor to cause the apparatus to:
train one or more layers of a machine learning network based at least in part on application data associated with the extended reality system and an estimated head motion range associated with the extended reality system;
receive one or more bias corrected inertial measurement unit measurements based at least in part on a sensor;
model a relative head pose of the user as a polynomial of time over a prediction interval based at least in part on the one or more bias corrected inertial measurement unit measurements and the trained one or more layers; and
determine a future relative head pose of the user based at least in part on the polynomial.

16. The apparatus of claim 15, wherein the instructions to train the one or more layers of the machine learning network are executable by the processor to cause the apparatus to:
train the one or more layers on-line using the application data, eye gaze tracking data, estimated body pose data, posture detection data, or some combination thereof.

17. The apparatus of claim 16, wherein the one or more layers are trained on-line based at least in part on a prediction error associated with the machine learning network.

18. The apparatus of claim 15, wherein the instructions are further executable by the processor to cause the apparatus to:
determine side channel data based at least in part on the user, the application data, or both, wherein the future relative head pose is determined based at least in part on the side channel data and the polynomial.

19. The apparatus of claim 18, wherein the instructions are further executable by the processor to cause the apparatus to:
model uncertainty of the polynomial based at least in part on a prediction error associated with the machine learning network; and
determine a weighted combination of the polynomial and the side channel data, wherein the future relative head pose is based at least in part on the weighted combination.

20. An apparatus for predicting head pose of a user in an extended reality system, comprising:
means for training one or more layers of a machine learning network based at least in part on application data associated with the extended reality system and an estimated head motion range associated with the extended reality system;
means for receiving one or more bias corrected inertial measurement unit measurements based at least in part on a sensor;
means for modeling a relative head pose of the user as a polynomial of time over a prediction interval based at least in part on the one or more bias corrected inertial measurement unit measurements and the trained one or more layers; and
means for determining a future relative head pose of the user based at least in part on the polynomial.

* * * * *